(12) United States Patent
Akkarakaran et al.

(10) Patent No.: US 11,265,197 B2
(45) Date of Patent: Mar. 1, 2022

(54) SYNCHRONIZATION SIGNAL BLOCK DESIGN

(71) Applicant: QUALCOMM Incorporated, San Diego, CA (US)

(72) Inventors: Sony Akkarakaran, Poway, CA (US); Jing Sun, San Diego, CA (US); Xiaoxia Zhang, San Diego, CA (US); Tao Luo, San Diego, CA (US); Juan Montojo, San Diego, CA (US); Arumugam Chendamarai Kannan, San Diego, CA (US); Sinnivas Yerramalli, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/908,508

(22) Filed: Jun. 22, 2020

(65) Prior Publication Data

US 2020/0412590 A1  Dec. 31, 2020

Related U.S. Application Data

(60) Provisional application No. 62/866,593, filed on Jun. 25, 2019.

(51) Int. Cl.
*H04W 72/04* (2009.01)
*H04L 27/26* (2006.01)
*H04L 5/00* (2006.01)

(52) U.S. Cl.
CPC ........ *H04L 27/2613* (2013.01); *H04L 5/0007* (2013.01); *H04L 5/0048* (2013.01); *H04L 27/2614* (2013.01); *H04W 72/042* (2013.01)

(58) Field of Classification Search
CPC . H04L 27/2613; H04L 5/0007; H04L 5/0048; H04L 27/2614; H04L 27/2636;
(Continued)

(56) References Cited

U.S. PATENT DOCUMENTS

2018/0091249 A1\* 3/2018 Han ................ H04L 5/0094
2018/0279292 A1\* 9/2018 Luo ................ H04L 1/0028
(Continued)

OTHER PUBLICATIONS

Iith., et al., "Design Options for NB-PSS and NB-SS", 3GPP Draft, 3GPP TSG-RAN WG1 NB-IoT Ad-Hoc Meeting, R1-160066, 3rd Generation Partnership Project (3GPP), Mobile Competence Centre, 650, Route Des Lucioles, F-06921, Sophia-Antipolis Cedex, France, vol. RAN WG1, No. Budapest, HU, Jan. 18, 2016-Jan. 20, 2016, Jan. 17, 2016 (Jan. 17, 2016), XP051053387, 8 pages, Retrieved from the Internet: URL:http://www.3gpp.org/ftp/Meetings_3GPP_SYNC/RAN1/Docs/ [retrieved on Jan. 17, 2016] Sections 2., 4. and 5.
(Continued)

*Primary Examiner* — Eva Y Puente
(74) *Attorney, Agent, or Firm* — Holland & Hart LLP

(57) ABSTRACT

Methods, systems, and devices for synchronization signal block (SSB) design are described to enable a base station to configure and transmit an SSB with a peak to average power ratio (PAPR) below a threshold. A low-PAPR SSB configuration may include a primary synchronization signal (PSS), a physical broadcast channel (PBCH), and a secondary synchronization signal (SSS). A user equipment (UE) may use the low-PAPR SSB configuration to monitor for and decode the SSB and begin communications with the base station. A low-PAPR SSB configuration may indicate available PSS sequences and lengths. A low-PAPR SSB configuration may also indicate multiplexing and symbol arrangements for a PBCH, DMRS, and SSS, and low-PAPR communications methods. A configuration may further indi-
(Continued)

cate reference signal configurations, information for different communication types, subcarrier spacing, a number of symbols of an SSB, or a number of available SSBs and associated groups.

30 Claims, 21 Drawing Sheets

(58) Field of Classification Search
CPC . H04L 5/0044; H04L 5/0053; H04L 27/2602; H04L 5/0051; H04L 5/001; H04L 5/0094; H04W 72/0413; H04W 72/042; H04W 72/0446; H04W 72/1268; H04W 72/04; H04W 72/0453; H04W 56/001; H04W 72/1289; H04W 74/0833; H04W 24/10; H04W 74/006
USPC ............................................... 375/260
See application file for complete search history.

(56) References Cited

U.S. PATENT DOCUMENTS

| | | | |
|---|---|---|---|
| 2018/0287840 A1* | 10/2018 | Akkarakaran | H04L 27/2692 |
| 2018/0324719 A1 | 11/2018 | Liu et al. | |
| 2018/0337755 A1* | 11/2018 | John Wilson | H04J 11/0076 |
| 2020/0295896 A1* | 9/2020 | Xiong | H04W 72/0453 |
| 2020/0322199 A1* | 10/2020 | Matsumura | H04L 5/0048 |
| 2020/0344811 A1* | 10/2020 | Ren | H04W 72/0446 |

OTHER PUBLICATIONS

International Search Report and Written Opinion—PCT/US2020/039428—ISA/EPO—dated Oct. 2, 2020.

ZTE., et al., "Discussion on Synchronization Mechanism in NR V2X," 3GPP Draft, 3GPP TSG RAN WG1 Meeting #95, R1-1812732, Discussion on Synchronization Mechanism in NR V2X, 3rd Generation Partnership Project (3GPP), Mobile Competence Centre, 650, Route Des Lucioles, F-06921, Sophia-Antipolis Cedex, France, vol. RAN WG1. No. Spokane. USA, Nov. 12, 2018-Nov. 16, 2018, Nov. 11, 2018 (Nov. 11, 2018), XP051554690, 5 pages, Retrieved from the Internet: URL: http://www.3gpp.org/ftp/Meetings%5F3GPP%5FSYNC/RAN1/Docs/R1%2D1812732%2Ezip [retrieved on Nov. 11, 2018] Section 2. Discussion.

* cited by examiner

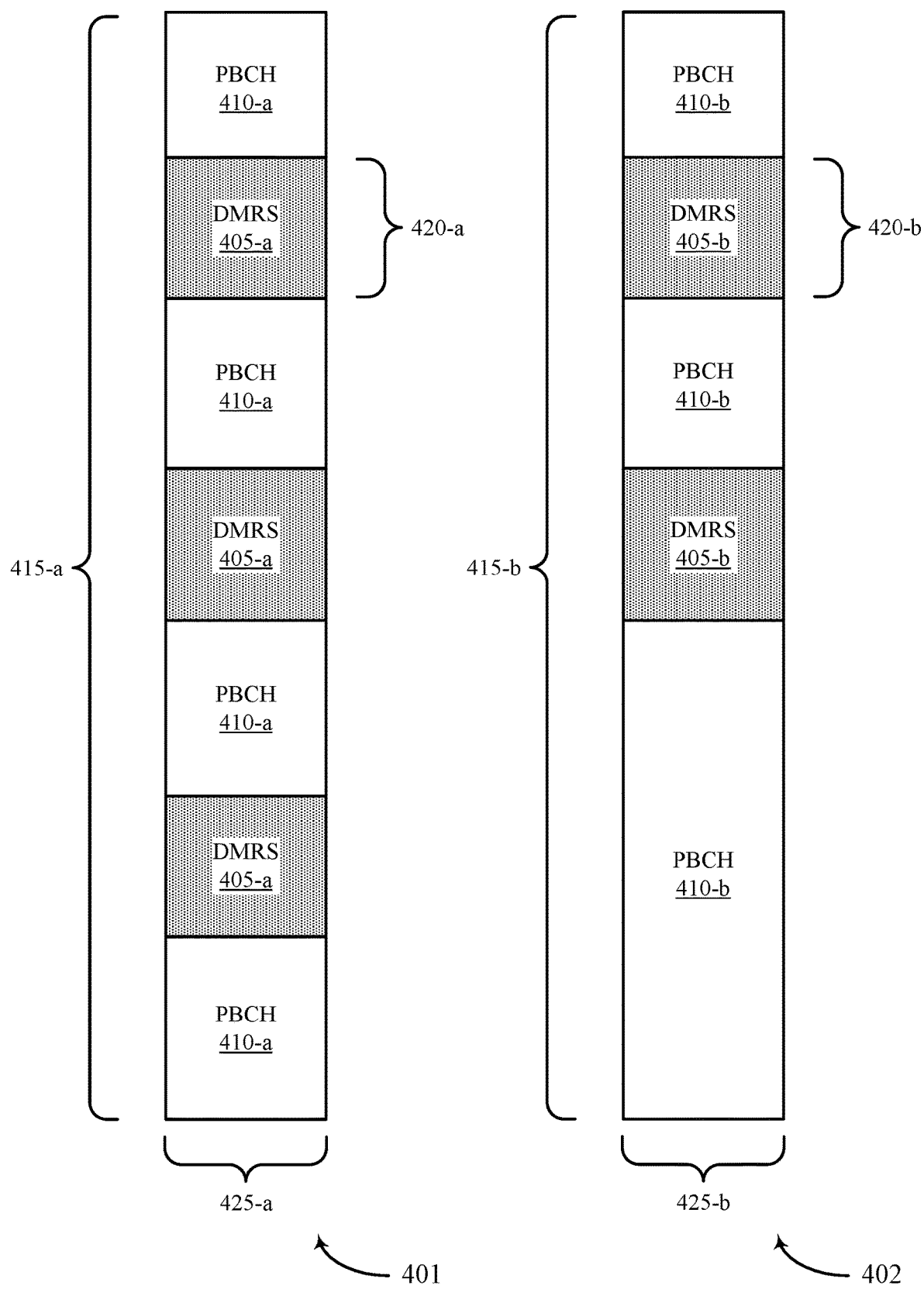

SYNCHRONIZATION SIGNAL BLOCK DESIGN

CROSS REFERENCE

The present application for patent claims the benefit of U.S. Provisional Patent Application No. 62/866,593 by AKKARAKARAN et al., entitled "SYNCHRONIZATION SIGNAL BLOCK DESIGN," filed Jun. 25, 2019, assigned to the assignee hereof, and expressly incorporated by reference herein.

FIELD OF TECHNOLOGY

The present disclosure relates generally to wireless communications and more specifically to synchronization signal block (SSB) design.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include a number of base stations or network access nodes, each simultaneously supporting communication for multiple communication devices, which may be otherwise known as user equipment (UE).

In some wireless communications systems (e.g., in systems operating in different frequency ranges), factors may affect communications between a base station and a UE. For example, a UE may be unable to decode or transmit information that falls outside power distribution characteristics.

SUMMARY

The described techniques relate to improved methods, systems, devices, and apparatuses that support synchronization signal block (SSB) design. Generally, the described techniques provide for configuring an SSB to have a peak to average power ratio (PAPR) below a threshold (e.g., a threshold defined by a standard, configured by the network such as a core network node, or indicated to a UE or base station dynamically, semi-statically, or periodically). In some examples, a low-PAPR SSB configuration may include configurations associated with a primary synchronization signal (PSS), a physical broadcast channel (PBCH), and a secondary synchronization signal (SSS). In some cases, the parameters included in a low-PAPR SSB configuration may be based on a system communications configuration, a traffic level, a frequency range, or the like. A low-PAPR SSB configuration or a partial low-PAPR SSB configuration (e.g., including one or more SSB configuration parameters) may be based on a synchronization raster point. A base station may transmit an SSB corresponding to a low-PAPR configuration and a user equipment (UE) may use the low-PAPR SSB configuration to monitor for and decode the SSB and begin communications with the base station.

Some low-PAPR SSB configurations may include configurations for a PSS, SSS, or PBCH of an SSB. For example, a number of available PSS sequences or a PSS sequence length may be defined by an SSB configuration. In some cases, a PSS sequence may be configured to implicitly indicate information, such as a waveform type of an associated PBCH or SSS. In some cases, a low-PAPR SSS may be configured to be multiplexed with a PBCH or configured within its own symbol. A PBCH or SSS may be passed through a discrete Fourier transform (DFT) spreading operation prior to orthogonal frequency division multiplexing (OFDM) resource element (RE) mapping in order to create a low-PAPR symbol. In some cases, demodulation reference signals (DMRSs) included in the PBCH may be grouped in sections of greater than one subcarrier. In some cases, DMRS may be grouped within its own symbol (e.g., separate from any symbols including the PBCH) and in some examples, the SSS or the PSS may serve as a DMRS. Additional symbols or REs may be added to the SSB for the PSS, PBCH, SSS, DMRS, or other information. In some cases, the number of subcarriers may be the same across the PSS, SSS, and PBCH. The SSS may be partitioned into sections corresponding to information related to various types of communications. In some examples, a low-PAPR SSB configuration may define an SSB subcarrier spacing, a number of symbols associated with an SSB, or a number of available SSBs and SSB bursts.

A method of wireless communications at a base station is described. The method may include identifying a set of synchronization signals for an SSB, determining a waveform from a set of waveforms for each synchronization signal of the set of synchronization signals, where the set of waveforms are waveforms having a PAPR below a threshold, and transmitting the SSB including the set of synchronization signals using the determined waveforms.

An apparatus for wireless communications at a base station is described. The apparatus may include a processor, memory coupled with the processor, and instructions stored in the memory. The instructions may be executable by the processor to cause the apparatus to identify a set of synchronization signals for an SSB, determine a waveform from a set of waveforms for each synchronization signal of the set of synchronization signals, where the set of waveforms are waveforms having a PAPR below a threshold, and transmit the SSB including the set of synchronization signals using the determined waveforms.

Another apparatus for wireless communications at a base station is described. The apparatus may include means for identifying a set of synchronization signals for an SSB, determining a waveform from a set of waveforms for each synchronization signal of the set of synchronization signals, where the set of waveforms are waveforms having a PAPR below a threshold, and transmitting the SSB including the set of synchronization signals using the determined waveforms.

A non-transitory computer-readable medium storing code for wireless communications at a base station is described. The code may include instructions executable by a processor to identify a set of synchronization signals for an SSB, determine a waveform from a set of waveforms for each synchronization signal of the set of synchronization signals, where the set of waveforms are waveforms having a PAPR below a threshold, and transmit the SSB including the set of synchronization signals using the determined waveforms.

Some examples of the method, apparatuses, and non-transitory computer-readable medium described herein may further include operations, features, means, or instructions for identifying a PSS of the set of synchronization signals, and determining a sequence of a set of sequences for the PSS, where the sequence indicates the waveform for an SSS of the set of synchronization signals or a PBCH of the SSB.

In some examples of the method, apparatuses, and non-transitory computer-readable medium described herein, the set of sequences includes one sequence or more than three sequences.

Some examples of the method, apparatuses, and non-transitory computer-readable medium described herein may further include operations, features, means, or instructions for determining a length of a sequence for a PSS of the set of synchronization signals, where the length may be based on a length of one or more other synchronization signals of the set of synchronization signals, a number of resources allocated for the PSS, a number of resources allocated for the one or more other synchronization signals of the set of synchronization signals, or any combination thereof.

Some examples of the method, apparatuses, and non-transitory computer-readable medium described herein may further include operations, features, means, or instructions for identifying an SSS of the set of synchronization signals, and determining the waveform for the SSS, where the waveform includes a discrete Fourier transform spread orthogonal frequency division multiplexing (DFT-s-OFDM) waveform.

Some examples of the method, apparatuses, and non-transitory computer-readable medium described herein may further include operations, features, means, or instructions for mapping the SSS to an OFDM symbol of the SSB independent of other synchronization signals of the set of synchronization signals.

In some examples of the method, apparatuses, and non-transitory computer-readable medium described herein, the OFDM symbol to which the SSS may be mapped includes a same number of REs as other OFDM symbols of the SSB to which one or more other synchronization signals of the set of synchronization signals may be mapped.

Some examples of the method, apparatuses, and non-transitory computer-readable medium described herein may further include operations, features, means, or instructions for determining a sequence of a set of sequences for the SSS, where the sequence includes a $\pi/2$ binary phase shift keying (BPSK) sequence, an m-sequence, or a Zadoff-Chu sequence.

Some examples of the method, apparatuses, and non-transitory computer-readable medium described herein may further include operations, features, means, or instructions for filtering the sequence for the SSS as a function of a synchronization raster point.

Some examples of the method, apparatuses, and non-transitory computer-readable medium described herein may further include operations, features, means, or instructions for including information in resources allocated to the SSS, where the information includes sidelink information, integrated access and backhaul (IAB) information, relay information, vehicle to everything (V2X) information, or any combination thereof.

Some examples of the method, apparatuses, and non-transitory computer-readable medium described herein may further include operations, features, means, or instructions for multiplexing a DMRS for a PBCH with an SSS of the set of synchronization signals according to a DMRS pattern, where the DMRS pattern indicates a set of multiple contiguous REs for placement of the DMRS.

Some examples of the method, apparatuses, and non-transitory computer-readable medium described herein may further include operations, features, means, or instructions for determining a waveform for a PBCH of the SSB, where the waveform includes a DFT-s-OFDM waveform.

Some examples of the method, apparatuses, and non-transitory computer-readable medium described herein may further include operations, features, means, or instructions for performing a DFT spreading operation on the SSB to generate a DFT-s-OFDM waveform of the SSB.

In some examples of the method, apparatuses, and non-transitory computer-readable medium described herein, an SSS of the set of synchronization signals may be multiplexed with a PBCH of the SSB.

Some examples of the method, apparatuses, and non-transitory computer-readable medium described herein may further include operations, features, means, or instructions for identifying a PBCH of the SSB, identifying a DMRS for the PBCH, and mapping the DMRS and the PBCH to one or more OFDM symbols of the SSB based on a DMRS pattern, where the DMRS pattern defines one or more sets of multiple contiguous REs for placement of the DMRS.

In some examples of the method, apparatuses, and non-transitory computer-readable medium described herein, the one or more sets of multiple contiguous REs and a number of the multiple contiguous REs may be based on a number of resource blocks (RBs) allocated for the PBCH.

Some examples of the method, apparatuses, and non-transitory computer-readable medium described herein may further include operations, features, means, or instructions for multiplexing the DMRS according to a time division multiplexing scheme on one or more additional OFDM symbols of the SSB.

Some examples of the method, apparatuses, and non-transitory computer-readable medium described herein may further include operations, features, means, or instructions for including a first number of bits in the DMRS, where the first number of bits indicates an index of the SSB, and including a second number of bits in a payload of the PBCH, where at least one of the first and second numbers of bits may be different from 3.

In some examples of the method, apparatuses, and non-transitory computer-readable medium described herein, a DMRS for a PBCH of the SSB, a number of symbols for an independent SSS, a number of SSBs of a synchronization signal burst period, or any combination thereof may be a function of a synchronization raster point.

Some examples of the method, apparatuses, and non-transitory computer-readable medium described herein may further include operations, features, means, or instructions for determining the waveform from the set of waveforms for each synchronization signal of the set of synchronization signals based on a synchronization raster point.

Some examples of the method, apparatuses, and non-transitory computer-readable medium described herein may further include operations, features, means, or instructions for indicating information corresponding to the SSB in a system information block (SIB), where the information includes an indication of one or more groups of SSBs and one or more sets of SSBs of the one or more groups of SSBs for transmission by the base station.

A method of wireless communications at a UE is described. The method may include monitoring resources for an SSB from a base station, the SSB including a set of synchronization signals, determining a waveform from a set of waveforms for each synchronization signal of the set of synchronization signals, where the set of waveforms are waveforms having a PAPR below a threshold, and decoding one or more synchronization signals of the set of synchronization signals based on the monitoring and the determined waveforms.

An apparatus for wireless communications at a UE is described. The apparatus may include a processor, memory coupled with the processor, and instructions stored in the memory. The instructions may be executable by the processor to cause the apparatus to monitor resources for an SSB from a base station, the SSB including a set of synchronization signals, determine a waveform from a set of waveforms for each synchronization signal of the set of synchronization signals, where the set of waveforms are waveforms having a PAPR below a threshold, and decode one or more synchronization signals of the set of synchronization signals based on the monitoring and the determined waveforms.

Another apparatus for wireless communications at a UE is described. The apparatus may include means for monitoring resources for an SSB from a base station, the SSB including a set of synchronization signals, determining a waveform from a set of waveforms for each synchronization signal of the set of synchronization signals, where the set of waveforms are waveforms having a PAPR below a threshold, and decoding one or more synchronization signals of the set of synchronization signals based on the monitoring and the determined waveforms.

A non-transitory computer-readable medium storing code for wireless communications at a UE is described. The code may include instructions executable by a processor to monitor resources for an SSB from a base station, the SSB including a set of synchronization signals, determine a waveform from a set of waveforms for each synchronization signal of the set of synchronization signals, where the set of waveforms are waveforms having a PAPR below a threshold, and decode one or more synchronization signals of the set of synchronization signals based on the monitoring and the determined waveforms.

Some examples of the method, apparatuses, and non-transitory computer-readable medium described herein may further include operations, features, means, or instructions for identifying a PSS of the set of synchronization signals, and determining a sequence of a set of sequences for the PSS, where the sequence indicates the waveform for an SSS of the set of synchronization signals or a PBCH of the SSB.

Some examples of the method, apparatuses, and non-transitory computer-readable medium described herein may further include operations, features, means, or instructions for determining a length of a sequence for a PSS of the set of synchronization signals, where the length may be based on a length of one or more other synchronization signals of the set of synchronization signals, a number of resources allocated for the PSS, a number of resources allocated for the one or more other synchronization signals of the set of synchronization signals, or any combination thereof.

Some examples of the method, apparatuses, and non-transitory computer-readable medium described herein may further include operations, features, means, or instructions for identifying a DMRS for a PBCH multiplexed with an SSS of the set of synchronization signals based on a DMRS pattern, where the DMRS pattern indicates a set of multiple contiguous REs for placement of the DMRS.

Some examples of the method, apparatuses, and non-transitory computer-readable medium described herein may further include operations, features, means, or instructions for identifying an SSS of the set of synchronization signals, and determining the waveform for the SSS, where the waveform includes a DFT-s-OFDM waveform.

Some examples of the method, apparatuses, and non-transitory computer-readable medium described herein may further include operations, features, means, or instructions for determining the waveform for a PBCH of the SSB, where the waveform includes a DFT-s-OFDM waveform.

Some examples of the method, apparatuses, and non-transitory computer-readable medium described herein may further include operations, features, means, or instructions for identifying a DMRS for a PBCH of the SSB based on a DMRS pattern, where the DMRS pattern defines one or more sets of multiple contiguous REs for the DMRS.

BRIEF DESCRIPTION OF THE DRAWINGS

FIGS. 4A and 4B illustrate examples of demodulation reference signal (DMRS) configurations that support SSB design in accordance with aspects of the present disclosure.

DETAILED DESCRIPTION

Figure 1:
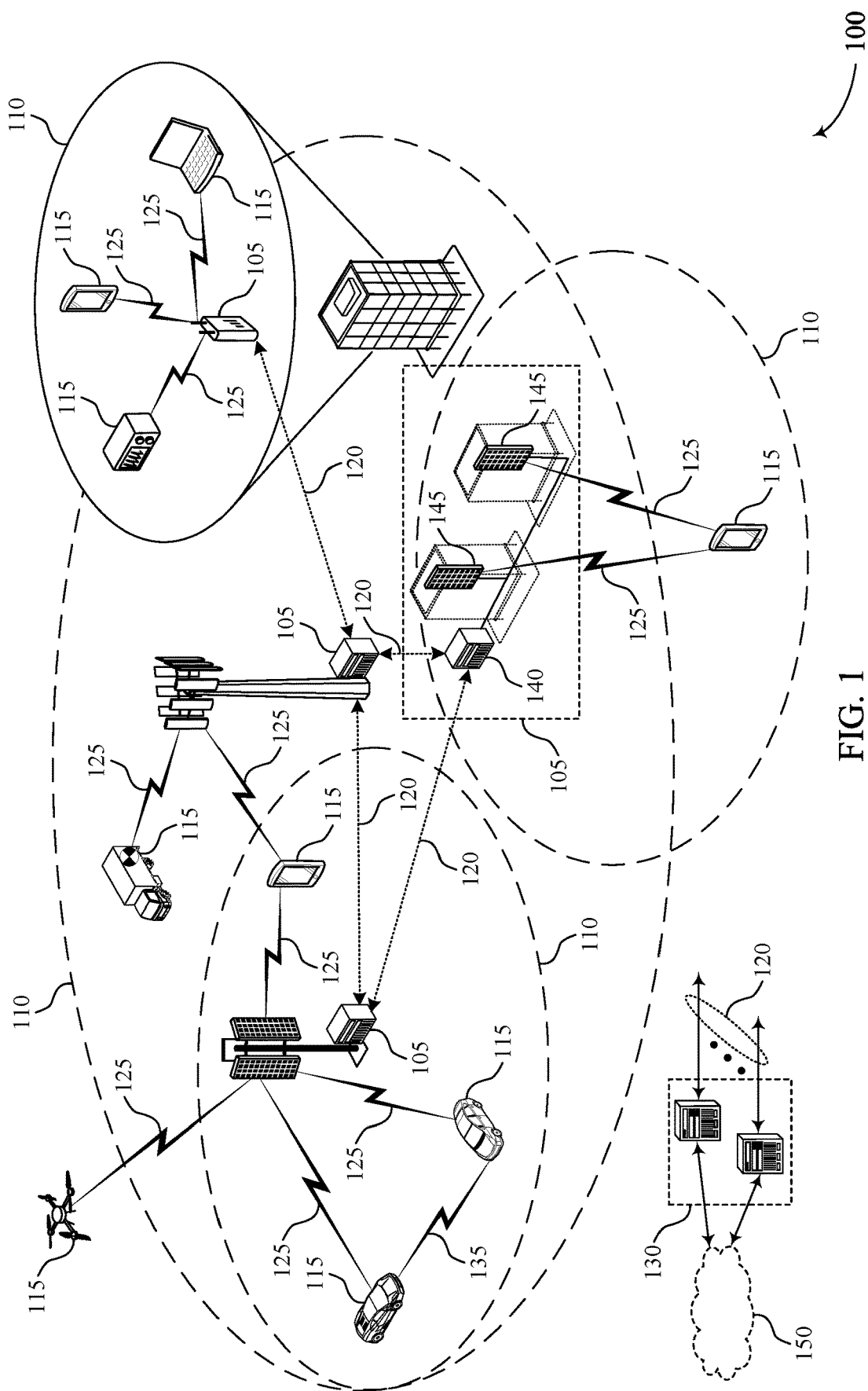
FIG. 1 illustrates an example of a wireless communications system that supports synchronization signal block (SSB) design in accordance with aspects of the present disclosure.

A base station may transmit one or more synchronization signal blocks (SSBs) to a user equipment (UE) and the UE may process (e.g., decode) the SSBs in order to obtain system information and begin communications with the base station. An SSB may include synchronization signals such as a primary synchronization signal (PSS), a physical broadcast channel (PBCH), and a secondary synchronization signal (SSS), which may be referred to as acquisition signals and may be transmitted from the base station to the UE. The PSS, PBCH, and SSS may each occupy different sets of symbols (e.g., orthogonal frequency division multiplexing (OFDM) symbols) and subcarriers of the SSB.

In some higher frequency ranges, factors such as high phase noise, power amplifier (PA) non-linearity, or thermal-limited operations may affect communications between the base station and the UE. For example, the UE may miss or otherwise be unable to decode data that does not correspond to communications at or under a threshold peak to average power ratio (PAPR). In some cases, PA nonlinearities may create waveform distortion when a transmission power is close to a maximum PA output power at a transmitting device. Thus, waveforms having lower PAPR may be transmitted at higher average transmit powers while maintaining an instantaneous or peak transmit power. Although these low PAPR waveforms may be subject to similar levels of distortion, the use of lower PAPR waveforms may result in increased coverage through the use of higher transmission powers (e.g., higher average transmit powers). As such, a base station may employ low-PAPR waveforms for downlink transmissions in order to improve reliability, where a low-PAPR waveform may be a waveform with a PAPR below a threshold (e.g., a threshold defined by a standard or system limitations, configured by the network such as a core network node, or indicated to a UE or base station dynamically, semi-statically, periodically, or aperiodically. In some cases, the base station may employ low-PAPR waveforms for some communications but not for SSB communications (e.g., in order to simplify a communications structure).

If low-PAPR SSBs are frequency-domain multiplexed (FDMed) with one or more channels that use low-PAPR waveforms, the lower PAPR of either or both of the SSBs and the one or more other channels may be destroyed in a resulting composite waveform. Some SSBs may repeat in a time domain or may be transmitted over larger symbol lengths in order to extend wireless communications coverage by the base station. If the longer or repeated SSBs are not multiplexed with low-PAPR channels, resources may go unused when transmitting the SSBs.

An SSB and one or more other channels may be separately and simultaneously transmitted by increasing a number of antenna panels or arrays (e.g., antenna arrays) associated with the base station or the UE. However, increasing a number of panels or arrays associated with a device may introduce complexity and increase costs, and forming multiple beams (e.g., receive beams) simultaneously may be beyond a scope of capabilities of the UE. Therefore, in some cases, the base station may configure one or more synchronization signals of an SSB to be transmitted using a low-PAPR waveform, in order to multiplex the SSB with other channels and maintain a low PAPR for downlink communications.

In some examples, a low-PAPR SSB configuration may include configurations (e.g., parameters such as sequence length or slot placement) associated with a PSS, a PBCH, and an SSS. Some low-PAPR SSB configurations may include one or more parameters and may not include one or more other parameters associated with the synchronization signals of the SSB. In some cases, the parameters included in a low-PAPR SSB configuration may be based on a system communications configuration, a traffic level, a frequency range or band, or the like. An SSB configuration or partial SSB configuration (e.g., including one or more SSB configuration parameters or information of a low-PAPR waveform configuration) may be based on a synchronization raster point. Basing an SSB configuration on the synchronization raster point may lower UE search complexity, because the UE may avoid trying to detect SSBs at a given raster point as multiple hypotheses for the SSB configuration parameters may be based on the raster point. For instance, a given synchronization raster point may specify, indicate, or otherwise correspond to one or more SSB configuration parameters and multiple synchronization raster points may be supported by a UE or base station. In one example, different frequency bands or channel types may be associated with different raster points (e.g., frequency step sizes) and the different raster points may indicate different parameters for an SSB configuration. Based on the low-PAPR SSB configuration (e.g., waveform parameters), the UE may monitor for and decode an SSB and begin communications with the base station.

Some low-PAPR SSB configurations may include sequence configurations for a PSS. For example, a number of available PSS sequences may be defined by an SSB configuration, where the number of available PSS sequences may be based on a capability or functionality of the base station or UE. In some cases, a PSS sequence may be configured to implicitly indicate information, such as a waveform type of an associated PBCH or SSS. In some cases, a PSS may be configured to occupy a same bandwidth as an associated PBCH or SSS and a PSS sequence length may be configured to match the bandwidth.

A low-PAPR SSB configuration may additionally or alternatively include configurations for an SSS. In some cases, a low-PAPR SSS may be configured to be multiplexed with a PBCH in a same OFDM symbol, and the PBCH and SSS may be passed through a discrete Fourier transform (DFT) spreading operation in order to create a low-PAPR OFDM symbol. In some cases, demodulation reference signals (DMRS) included in the PBCH may be grouped in sections of multiple subcarriers or pre-DFT-spreading resource elements (REs) (or chips) to lower an inter-chip interference between the DMRS and PBCH data modulation symbols and lower interference between the DMRS and the SSS if the SSS is multiplexed in the same OFDM symbol.

A number of DMRS sections and a number of modulation symbols in each section may be included in SSB configuration parameters and may depend on one or more of a length of a DMRS sequence, a number of resource blocks (RBs) of the SSB, the synchronization raster point, etc. In some cases, a DMRS may be grouped within its own OFDM symbol (e.g., separate from any OFDM symbols that include the PBCH, SSS, or PSS) and in some examples, the SSS and/or the PSS may serve as a DMRS. In some examples, a low-PAPR SSB configuration may group DMRS within the PBCH and may additionally include DMRS within a separate symbol. In some examples, the SSS may also be configured within its own symbol, separate from any symbols including the PBCH. In such cases, additional symbols or REs may be added to the SSB for the PBCH. In some cases, the number of subcarriers may also be the same across the PSS, SSS, and PBCH. The SSS may also be configured with a low-PAPR sequence when multiplexed with the PBCH or when occupying its own symbol. The SSS may also be partitioned into sections corresponding to information related to various types of communications.

In some examples, a low-PAPR SSB configuration may define an SSB subcarrier spacing, a number of symbols associated with an SSB, or a number of available SSBs. Each supported SSB may also be associated with one or more SSB groups in order to indicate a transmission status of the SSB. In some cases, a larger number of low-PAPR SSBs may be available or used when compared with other SSBs (e.g., in frequency range 4 (FR4), containing carrier frequencies above 52.6 gigahertz (GHz), as opposed to frequency ranges 1 and 2, which are below 52.6 GHz). Accordingly, one or more numbers of indicator bits associated with SSBs or SSB groups may be increased to accommodate the larger number of low-PAPR SSBs.

Aspects of the disclosure are initially described in the context of wireless communications systems. Aspects of the disclosure are further illustrated by and described with reference to SSB configurations, DMRS configurations, a process flow, apparatus diagrams, system diagrams, and flowcharts that relate to SSB design.

FIG. 1 illustrates an example of a wireless communications system 100 that supports SSB design in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or DFT spread OFDM (DFT-s-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported DFT size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some higher frequency ranges, factors such as high phase noise, PA non-linearity, or thermal-limited operations may affect communications between a base station 105 and a UE 115. For example, the UE 115 may miss or otherwise be unable to decode data that does not correspond to communications at or under a threshold PAPR. In some cases, PA nonlinearities may create waveform distortion when a transmission power is close to a maximum PA output power. Thus, waveforms having lower PAPR may be transmitted at higher average transmit powers while maintaining an instantaneous or peak transmit power, thus resulting in similar levels of distortion. In other words, lower PAPR may result in increased coverage by allowing higher power transmission. As such, the base station 105 may employ low-PAPR waveforms for downlink transmissions in order to improve reliability, where a low-PAPR waveform may be a waveform with a PAPR below a threshold (e.g., a threshold defined by a standard, configured by the network such as a core network node, or indicated to a UE 115 or base station 105 dynamically, semi-statically, or periodically). If low PAPR SSBs are multiplexed with one or more channels that use low-PAPR waveforms, the lower PAPR of the one or more other channels may be destroyed in a resulting composite waveform. Further, if SSBs are not multiplexed with low-PAPR channels, resources may go unused when transmitting the SSBs.

An SSB and one or more other channels may be separately and simultaneously transmitted by increasing a number of antenna panels or arrays (e.g., antenna arrays) associated with the base station 105 or the UE 115. However, increasing a number of panels or arrays associated with a device may introduce complexity and increase costs, and forming multiple beams (e.g., receive beams) simultaneously may be beyond a scope of capabilities of the UE 115. Therefore, in some cases, the base station 105 may configure one or more synchronization signals of an SSB to be transmitted using a low-PAPR waveform, in order to multiplex the SSB with other channels and maintain a low PAPR for downlink communications.

In some examples, a low-PAPR SSB configuration may include configurations (e.g., parameters such as sequence length or slot placement) associated with a PSS, a PBCH, and an SSS. In some cases, the parameters included in a low-PAPR SSB configuration may be based on a system communications configuration, a traffic level, a frequency range or band, or the like. An SSB configuration or partial SSB configuration (e.g., including one or more SSB configuration parameters and/or details of a low-PAPR waveform configuration) may, in some cases, be based on a synchronization raster point. Basing an SSB configuration on the synchronization raster point may lower UE search complexity, because the UE may avoid trying to detect SSBs at a given raster point as multiple hypotheses for the SSB configuration parameters may be based on the raster point. The UE 115 may use a low-PAPR SSB configuration (e.g., waveform parameters) to monitor for and decode an SSB and begin communications with the base station 105.

Figure 2:
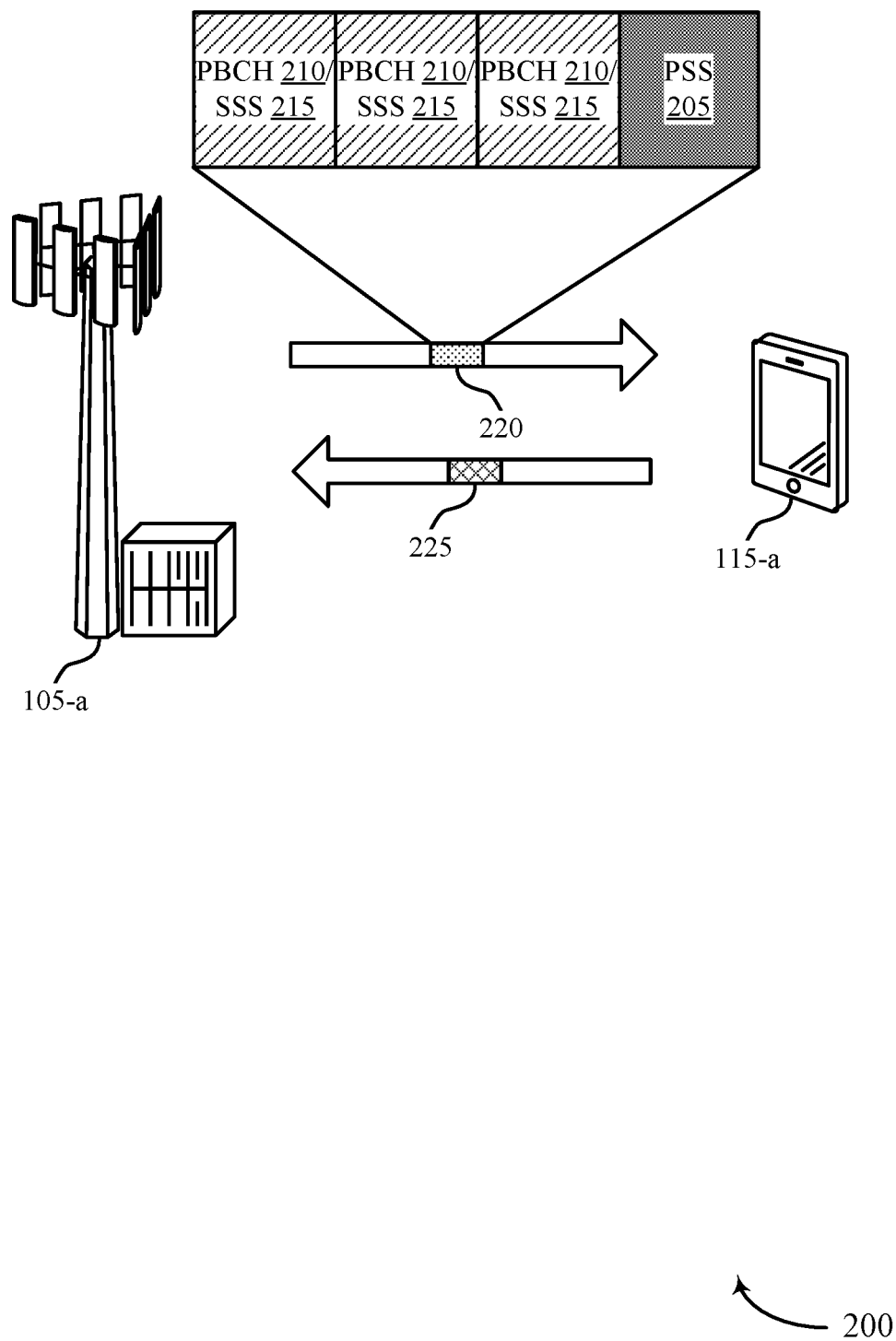
FIG. 2 illustrates an example of a wireless communications system that supports SSB design in accordance with aspects of the present disclosure.

FIG. 2 illustrates an example of a wireless communications system 200 that supports SSB design in accordance with aspects of the present disclosure. In some examples, wireless communications system 200 may implement aspects of wireless communications system 100 and may include a UE 115-a and a base station 105-a, which may be examples of a UE 115 and a base station 105 described with reference to FIG. 1. In some cases, base station 105-a may transmit one or more SSBs to UE 115-a and UE 115-a may process (e.g., decode) the SSBs in order to receive system information and begin communications with base station 105-a.

In some examples, an SSB 220 may include synchronization signals such as a PSS 205, a PBCH 210, and an SSS 215, which may be transmitted from base station 105-a to UE 115-a. Base station 105-a may transmit the SSB 220 over a predefined bandwidth in predefined symbols (e.g., OFDM symbols) of a slot or TTI. For example, an SSB 220 may occupy a predefined amount of time (e.g., 5 ms) at a beginning of an SSB period (e.g., 10 ms or 20 ms), and base station 105-a may repeat transmission of an SSB 220 once at the beginning of each SSB period. The PSS 205, PBCH 210, and SSS 215 may each occupy predefined symbols (e.g., OFDM symbols) and subcarriers included in the SSB 220. For example, PSS 205 may occupy 12 subcarriers of a first symbol of the SSB 220, SSS 215 may occupy 12 subcarriers of a third symbol of the SSB 220, and PBCH 210 may occupy 20 subcarriers of each of a second and fourth symbol of the SSB 220 and eight subcarriers of the third symbol. In other examples, a symbol of the SSB 220 may include a PBCH 210, an SSS 215, a combination of a PBCH 210 and an SSS 215 (e.g., multiplexed PBCH 210 and SSS 215), or other information related to other communications (e.g., sidelink or backhaul communications). UE 115-a may receive one or more synchronization signals of the SSB 220 and may use the received information to begin communications with base station 105-a via an uplink message 225.

In some examples, base station 105-a and UE 115-a may communicate in a frequency range (e.g., FR4) that includes higher frequencies (e.g., frequencies above 52.6 GHz). In some higher frequency ranges, factors such as high phase noise, PA non-linearity, or thermal-limited operations may affect communications between base station 105-a and UE 115-a. For example, UE 115-a may miss or otherwise be unable to decode data that does not correspond to communications at or under a threshold PAPR. In some cases, PA nonlinearities may create waveform distortion when a transmission power is close to a maximum PA output power at a transmitting device. Thus, waveforms having lower PAPR may be transmitted at higher average transmit powers while maintaining an instantaneous or peak transmit power. Although these low PAPR waveforms may be subject to similar levels of distortion, the use of lower PAPR waveforms may result in increased coverage through the use of higher transmission powers (e.g., higher average transmit powers).

As such, base station 105-a may employ low-PAPR waveforms (DFT-s-OFDM or single carrier frequency division multiplexing (SC-FDM)) for downlink transmissions in order to improve reliability. A low-PAPR waveform may be a waveform with a PAPR below a threshold, where the threshold may be based on one or more system conditions (e.g., channel conditions). The threshold may be defined by a standard or system limitations, configured by the network such as a core network node, or indicated to UE 115-*a* or base station 105-*a* (e.g., dynamically, semi-statically, periodically, or aperiodically). In some cases, base station 105-*a* may employ low-PAPR waveforms for some communications and not for SSB communications, for example, in order to simplify a communications structure.

If low-PAPR SSBs 220 are FDMed with one or more channels that use low-PAPR waveforms (e.g., a physical downlink shared channel (PDSCH)), the lower PAPR of either or both of the SSBs and the one or more other channels may be destroyed in a resulting composite waveform. Some SSBs 220 may repeat in a time domain or may be transmitted over larger symbol lengths in order to extend wireless communications coverage by a base station 105-*a*. For example, an SSB 220 or a synchronization signal of an SSB 220 may be repeated to approximate a longer symbol, or a subcarrier spacing may be adjusted to result in a longer symbol. If the longer or repeated SSBs 220 are not multiplexed with other channels (e.g., low-PAPR channels), resources may go unused when transmitting the SSBs 220.

An SSB 220 and one or more other channels may be separately and simultaneously transmitted by increasing a number of antenna panels or arrays associated with base station 105-*a* or UE 115-*a* (e.g., by installing more panels or arrays or sub-dividing an existing number of panels or arrays). For example, one or more arrays or sub-arrays may be used to transmit an SSB 220 and one or more arrays or sub-arrays may be separately used to transmit the one or more other channels. Increasing or sub-dividing a number of panels or arrays associated with a device may introduce complexity and increase costs. Additionally, forming multiple beams (e.g., receive beams) simultaneously may be beyond a scope of capabilities of UE 115-*a*. Therefore, in some cases, base station 105-*a* may configure one or more synchronization signals of an SSB 220 to be transmitted using a low-PAPR waveform in order to multiplex SSBs 220 with other channels and maintain a low PAPR for downlink communications.

In some examples, a low-PAPR SSB configuration may include configurations (e.g., parameters such as sequence length or slot placement) associated with a PSS 205, a PBCH 210, and an SSS 215 of an SSB 220. Such configurations may be applied to each SSB 220 transmitted by base station 105-*a* in a frequency range (e.g., FR4) or may be selectively applied to SSBs 220 transmitted within the frequency range. Additionally or alternatively, some low-PAPR SSB configurations may include one or more parameters and may not include one or more other parameters associated with the synchronization signals of the SSB 220. In some cases, the parameters included in a low-PAPR SSB configuration may be based on a system communications configuration, a traffic level, a frequency range or band, or the like. An SSB configuration or partial SSB configuration (e.g., including one or more SSB configuration parameters and/or details of a low-PAPR waveform configuration) may be based on a synchronization raster point.

Basing an SSB configuration on the synchronization raster point may lower UE search complexity, because the UE may avoid trying to detect SSBs at a given raster point as multiple hypotheses for the SSB configuration parameters may be based on the raster point. For instance, a given synchronization raster point may specify, indicate, or otherwise correspond to one or more SSB configuration parameters and multiple synchronization raster points may be supported by a UE or base station. In one example, different frequency bands or channel types may be associated with different raster points (e.g., frequency step sizes) and the different raster points may indicate different parameters for an SSB configuration. UE 115-*a* may use a low-PAPR SSB configuration (e.g., waveform parameters) to monitor for and decode an SSB and begin communications with base station 105-*a*.

Some low-PAPR SSB configurations may include sequence configurations for a PSS 205. For example, a number of available PSS sequences may be defined by an SSB configuration, where the number of available PSS sequences may be based on a capability or functionality of base station 105-*a* or UE 115-*a*. In one example, if base station 105-*a* transmits using one cell or sector (e.g., is an omni-base station), the number of available PSS sequences may be equal to one, while if base station 105-*a* transmits using a different number of cells or sectors (e.g., more than three) the number of available PSS sequences may be equal to the number of sectors. In some cases, a PSS sequence may be configured to implicitly indicate information, such as a waveform type (e.g., OFDM, DFT-s-OFDM, or both) of an associated PBCH 210 or SSS 215. A PSS sequence may also be configured based on a number of RBs or REs corresponding to a PSS 205 (e.g., based on a number of subcarriers occupied by the PSS 205). For example, a PSS 205 may be configured to occupy a same bandwidth as an associated PBCH 210 or SSS 215 and a PSS sequence length may be configured to match the bandwidth.

A low-PAPR SSB configuration may additionally or alternatively include configurations for an SSS 215. As described herein, an SSS 215 may share an OFDM symbol (e.g., be multiplexed) with a PBCH 210, such that an OFDM symbol (e.g., third symbol) of an SSB 220 may contain a number of subcarriers of the SSS 215 (e.g., 12 subcarriers) and a number of subcarriers of the PBCH (e.g., 8 subcarriers). In some cases, a low-PAPR SSS 215 may be configured by using the above-described multiplexed symbol structure and passing the PBCH 210 and SSS 215 through a DFT spreading operation (e.g., performed over the bandwidth of the SSB 220) in order to create a low-PAPR OFDM symbol. In some cases, the DFT spreading operation may be performed after mapping subcarriers and before performing an inverse fast Fourier transform (IFFT).

In some cases, DMRS included in the PBCH 210 may be grouped in sections (e.g., multiple pre-DFT spreading REs or chips) across the PBCH subcarriers to lower an inter-chip interference between the DMRS and PBCH data modulation symbols (e.g., and lower interference between the DMRS and the SSS 215 if the SSS 215 is multiplexed in the same OFDM symbol). A number of DMRS sections and a number of modulation symbols in each section may be included in SSB configuration parameters and may depend on one or more of a length of a DMRS sequence, a number of RBs of the SSB 220, a synchronization raster point, etc. DMRS grouping is described in further detail with reference to FIG. 4. In some cases, DMRS may be grouped within a separate OFDM symbol from any OFDM symbols including the PBCH 210, the SSS 215, or the PSS 205, and in some examples, the SSS 215 and/or the PSS 205 may serve as DMRS. In some examples, a low-PAPR SSB configuration may group DMRS within the PBCH 210 and may additionally include DMRS within a separate OFDM symbol.

In some examples, the SSS 215 may also be configured within its own OFDM symbol, separate from any OFDM symbols including the PBCH 215 (e.g., the SSS 215 and PBCH 210 may not be multiplexed). In such cases, additional symbols or REs may be added to the SSB 220 for the PBCH 210. As described herein, the number of REs or subcarriers may also be the same across the PSS 205, SSS 215, and PBCH 210. The SSS 215 may also be configured using a low-PAPR sequence, such as an m-sequence, Zadoff-Chu sequence, a m/2 binary phase-shift keyed (BPSK) sequence, or the like. The SSS 215 may be configured with a low-PAPR sequence when multiplexed with the PBCH 210 or when occupying its own OFDM symbol. In some cases, when an SSS 215 is configured with a low-PAPR sequence, the number of sequences may be limited by a sequence type. The set of possible sequences to be used for the SSS 215 may also be partitioned into sections corresponding to information related to IAB, vehicle communications (e.g., cellular V2X (CV2X)), sidelink communications, etc.

In some examples, a low-PAPR SSB configuration may define an SSB subcarrier spacing, a number of symbols associated with an SSB 220, or a number of SSB indices (e.g., supported SSBs 220). Each supported SSB 220 may also be associated with one or more SSB groups in order to indicate a transmission status of the SSB 220. For example, an indication in a system information block (SIB) (e.g., SIB1) may include a compressed indication (e.g., a simplified bitmap) which may include a first number of bits (e.g., M bits) to indicate which SSB groups are to be transmitted and a second number of bits (e.g., N bits) to indicate which SSBs 220 are transmitted within each group. In one example of a low-PAPR SSB configuration (e.g., in FR4), a number of SSB indices (e.g., 128 indices) may be higher than other SSB configurations (e.g., in lower frequency ranges). As such, a higher number of groups (e.g., 16 groups) of SSBs 220 may be configured or an SSB group may include a higher number of SSBs 220 (e.g., 16 SSBs).

Figure 3A:
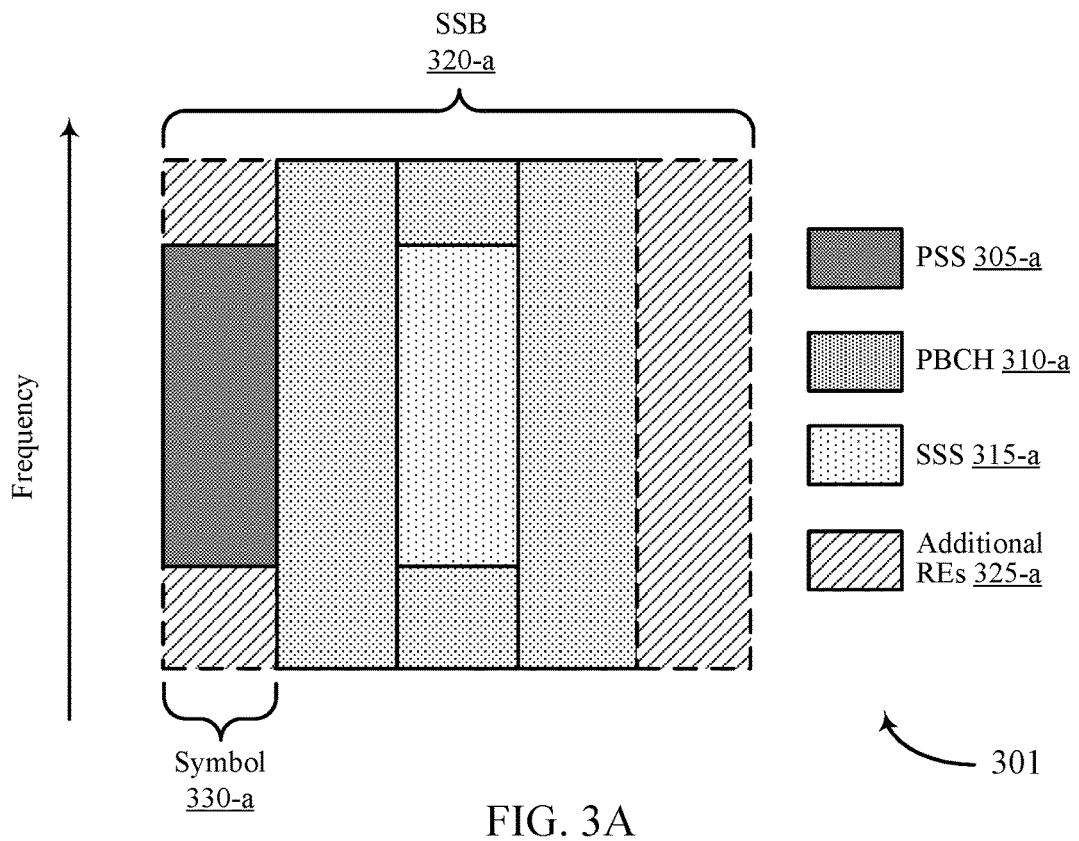
FIGS. 3A and 3B illustrate examples of SSB configurations that support SSB design in accordance with aspects of the present disclosure.
Figure 3B:
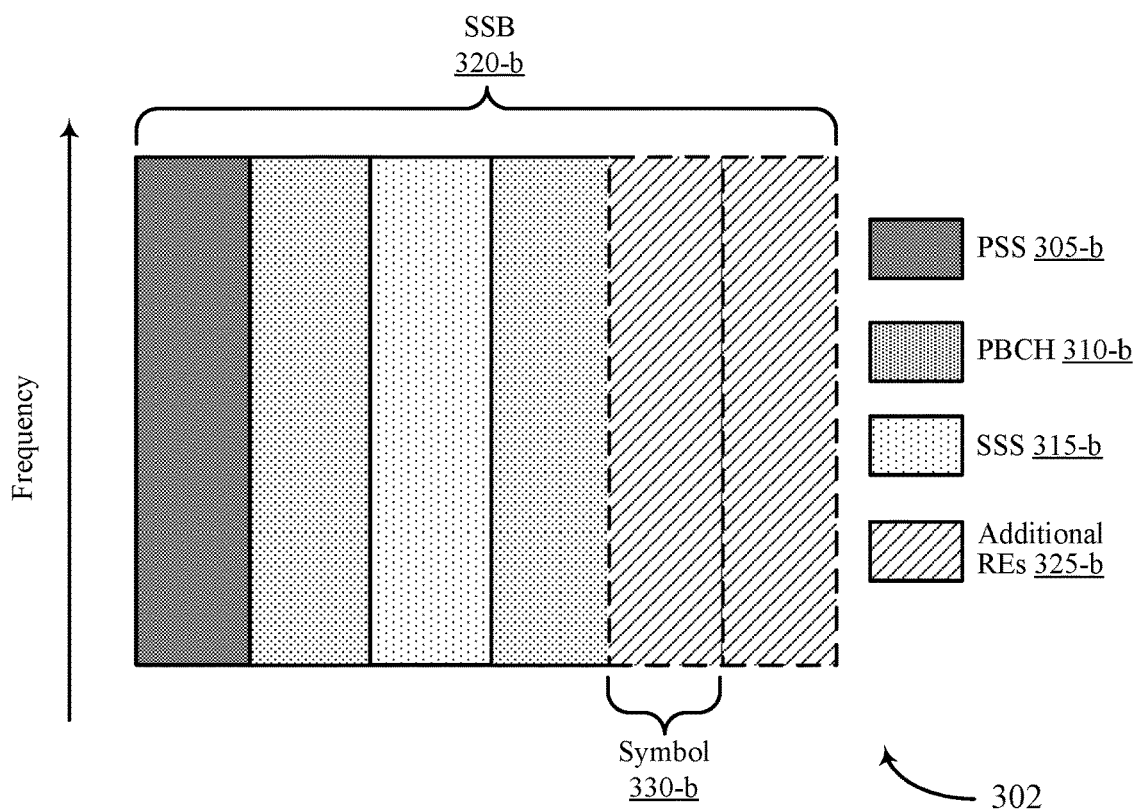

FIGS. 3A and 3B illustrate examples of SSB configurations 301 and 302 that support SSB design in accordance with aspects of the present disclosure. In some examples, SSB configurations 301 and 302 may implement aspects of wireless communication systems 100 or 200. For example, a base station 105 may implement aspects of SSB configuration 301, 302, or both when transmitting an SSB to a UE 115, where the UE 115 and the base station 105 may be examples of a UE 115 and a base station 105 described with reference to FIGS. 1 and 2. In some cases, the base station 105 may transmit one or more low-PAPR SSBs to UE 115 according to an SSB configuration 301 or 302. SSB configurations 301 and 302 may be examples of low-PAPR SSB configurations, as described with reference to FIGS. 1 and 2.

SSB configurations 301 and 302 may illustrate synchronization signals configurations of an SSB 320-a and 320-b, respectively, where the SSB synchronization signals may include a PSS 305, a PBCH 310, and an SSS 315. The synchronization signals of an SSB 320 may be configured over one or more symbols 330 (e.g., OFDM symbols in a time domain) and over one or more frequency ranges (e.g., a number of subcarriers or a bandwidth in a frequency domain). Additional REs 325 may also be configured to expand one or more synchronization signals of an SSB 320. For example, additional REs 325 may be used to expand a PSS 305 (e.g., in the frequency domain, as in symbol 330-a), or may be used to expand a PBCH 310 in the time domain (e.g., by adding a PBCH symbol 330, such as symbol 330-b). In some cases, additional REs 325 may be used to add a symbol 330 (e.g., symbol 330-b) dedicated to DMRS.

As described with reference to FIG. 2, the number of subcarriers (e.g., bandwidth) of each synchronization signal of an SSB 320 may vary, or may be equalized across synchronization signals. For example, PSS 305-a and SSS 315-a may each occupy 127 subcarriers (e.g., corresponding to slightly less than 12 RBs) while PBCH 310-a may correspond to 20 RBs in some symbols 330 and eight RBs in other symbols 330 (e.g., a symbol 330 including SSS 315-a). In another example, PSS 305-b, PBCH 310-b, and SSS 315-b may each occupy a same number of subcarriers or same bandwidth (e.g., corresponding to 20 RBs), in order to simplify communications and standardize a length of each SSB synchronization signal (e.g., sequence lengths). Additionally or alternatively, PSS 305-a may be configured to occupy a same bandwidth as PBCH 310-a but SSS 315-a may not be configured to occupy the same bandwidth. In examples where each SSB synchronization signal occupies the same number of subcarriers, each synchronization signal may occupy its own symbol (e.g., an SSS 315 may not be multiplexed with a PBCH 310) and sequence lengths of each synchronization signal may be configured such that each synchronization signal may occupy the same number of subcarriers.

In one example, an SSS 315-b may occupy its own symbol 330 (e.g., OFDM symbol) in order to avoid interference with DMRS associated with a PBCH 310-b. In some cases, when a PBCH 310 is not multiplexed with an SSS 315, the PBCH 310 may be configured to include additional REs 325 over one or more symbols 330 (e.g., in order to maintain a same size or amount of information of the PBCH 310). In some cases, a symbol of a PBCH 310 or an SSS 315 may be configured as described herein and may be passed through a DFT spreading operation to create a low-PAPR OFDM symbol 330 (e.g., DFT-s-OFDM symbol 330).

In some cases, an SSS 315 may be configured using a low-PAPR sequence, such as an m-sequence, Zadoff Chu sequence, a π/2 BPSK sequence, or the like. In some cases, when an SSS 315 is configured with a low-PAPR sequence, the number of sequences may be limited by a sequence type. Additionally, a π/2 BPSK sequence may be configured by performing a DFT spreading operation, as described above and with reference to FIG. 2. The base station 105 transmitting an SSB 320 may filter (e.g., in a time domain) or shape (e.g., in a frequency domain) the π/2 BPSK sequence to achieve a low PAPR. In some cases, filtering parameters (e.g., filtering weights) may be specified by a wireless communications standard or by a wireless system, and in some cases may be a function of a synchronization raster point.

In some examples, an SSS 315 or additional REs 325 may be configured with predefined partitions to indicate information associated with sidelink communications, CV2X communications, IAB relay, mobile IAB relay, etc. For example, an SSS 315 may be configured such that a first partition of REs of the SSS 315 (e.g., associated with four RBs corresponding to the lowest frequencies of the SSS 315) may indicate information associated with one form of communications (e.g., sidelink) and a second partition of REs (e.g., associated with four RBs corresponding to the highest frequencies of the SSS 315) may indicate information associated with another form of communications (e.g., IAB). In another example, 900 sequences of an SSS 315 may correspond to information for communications between the UE 115 and the base station 105, while 108 sequences of an SSS 315 may correspond to sidelink communications. An SSS 315 may be configured with any number of partitions to convey communications information. In some cases, a number of sequences (e.g., 1,008) associated with an SSS 315 may be expanded (e.g., expanded to 2,016) in order to accommodate a predefined number of partitions.

In some examples, additional REs 325 may be configured to include a symbol 330 (e.g., OFDM symbol) dedicated to DMRS (e.g., symbol 330-b). In such cases, the DMRS may be time-division multiplexed (TDMed) with other synchronization signals of an SSB 320, instead of being multiplexed with a PBCH 310. In some cases, the DMRS may be included within a separate symbol 330 and may additionally by multiplexed with a PBCH 310. Additionally or alternatively, a PSS 305 and/or an SSS 315 may serve as the DMRS associated with an SSB 320 (e.g., in order to decrease overhead), or both DMRS and a PSS 305 and/or an SSS 315 may serve as the DMRS associated with an SSB 320. In some cases, a PSS 305 may serve as DMRS if the UE 115 is able to match the PSS 305 to a single SSS 315 (e.g., ensure that the PSS 305 and an SSS 315 are associated with a same cell as a PBCH 310 that the UE 115 attempts to decode). In one example, the UE 115 may differentiate one or more PSSs 305 from different cells using a timing or a peak structure associated with the one or more PSSs 305.

DMRS (e.g., standalone DMRS or multiplexed DMRS) may include a first number of bits (e.g., m bits) corresponding to an SSB index and a PBCH 310 may include a second number of bits (e.g., n bits) corresponding to the SSB index in its payload. In some cases, either or both of the first number or the second number of bits may be increased to accommodate a larger number of SSB indices (e.g., larger than 64 indices, such as 128 indices) and a corresponding larger number of SSB beams (e.g., in FR4, when compared to lower frequency ranges), as described with reference to FIG. 2. For example, a higher subcarrier spacing or a higher number of slots occupied by an SSB 320 (e.g., in FR4) may result in a configuration with a higher number of SSB beams. SSB indices may be divided into groups of SSB indices in order to indicate SSB index information (e.g., SSB location parameters or which SSBs are transmitted). For example, the base station 105 may be configured with 128 SSB indices, divided into 16 groups of 8 SSBs 320 or divided into 8 groups of 16 SSBs 320. The base station 105 may include, within a SIB (e.g., SIB1), a first number of bits (e.g., M bits) to indicate which groups are transmitted and a second number of bits (e.g., N bits) to indicate which SSB indices (e.g., which SSBs 320) within each group are transmitted. Either or both of the first number or the second number of bits may be increased to accommodate a larger number of SSB indices and a corresponding larger number of SSB beams.

FIGS. 4A and 4B illustrate examples of DMRS configurations 401 and 402 that support SSB design in accordance with aspects of the present disclosure. In some examples, DMRS configurations 401 and 402 may implement aspects of wireless communication systems 100 or 200. For example, a base station 105 may use aspects of DMRS configuration 401, 402, or both when transmitting an SSB to a UE 115, where the UE 115 and the base station 105 may be examples of a UE 115 and a base station 105 described with reference to FIGS. 1-3. In some cases, the base station 105 may transmit one or more low-PAPR SSBs to UE 115 according to a low-PAPR SSB configuration, where the low-PAPR SSB configuration may include DMRS configuration 401 or 402.

As described above with reference to FIG. 2, DMRS 405 included in a PBCH 410 may be grouped in sections of contiguous REs across the PBCH bandwidth 415 in order to lower an inter-chip interference between the DMRS 405 and PBCH data modulation symbols (e.g., and lower interference between the DMRS 405 and the SSS if the SSS is multiplexed in a same OFDM symbol). Additionally or alternatively, a DMRS 405 may be included in its own symbol 425 (e.g., OFDM symbol), separate from any symbol 425 containing a PBCH 410, an SSS, or a PSS.

Each section of DMRS 405 within a same symbol 425 as a PBCH 410 may span more than one subcarrier or RE, where a size of each section (e.g., number of subcarriers or bandwidth 420) and the number of sections included in one symbol 425 (e.g., OFDM symbol) of a PBCH 410 may be based on a number of RBs (e.g., total number of RBs) or a bandwidth 415 associated with the PBCH 410. For example, a PBCH 410-a may include three sections of DMRS 405-a based on a number of RBs or a bandwidth 415-an associated with PBCH 410-a, while a PBCH 410-b may include two sections of DMRS 405-b based on a number of RBs or a bandwidth 415-b associated with PBCH 410-b. In one example, each section of DMRS 405-a may span 12 subcarriers (e.g., corresponding to one RB) such that PBCH 410-a may include three sections of DMRS 405-a with a span of 12 subcarriers each. In another example, DMRS 405-b may span a larger number of subcarriers (e.g., 18 subcarriers) than DMRS 405-a. In some cases, the sections DMRS 405 may be configured to be spread evenly across the PBCH bandwidth 415, as in the case of DMRS 405-a, or may be configured to be spread across a portion of the PBCH bandwidth, as in the case of DMRS 405-b.

The sections (e.g., section size) of DMRS 405 may be configured based on one or more parameters or conditions (e.g., phase tracking reference signal (PTRS) parameters) such as a quality of one or more oscillators, a carrier frequency, a subcarrier spacing, or a modulation and coding scheme used for transmission. When configuring a PBCH 410 using a DFT spreading operation, the sections of DMRS 405 may be inserted into the PBCH configuration in a time domain before performing the DFT spreading operation. A number of sections of DMRS 405 and a number of modulation symbols in each section may be included in SSB configuration parameters and may depend on one or more of a length of a DMRS sequence, a number of RBs of an SSB, a synchronization raster point, etc.

Figure 5:
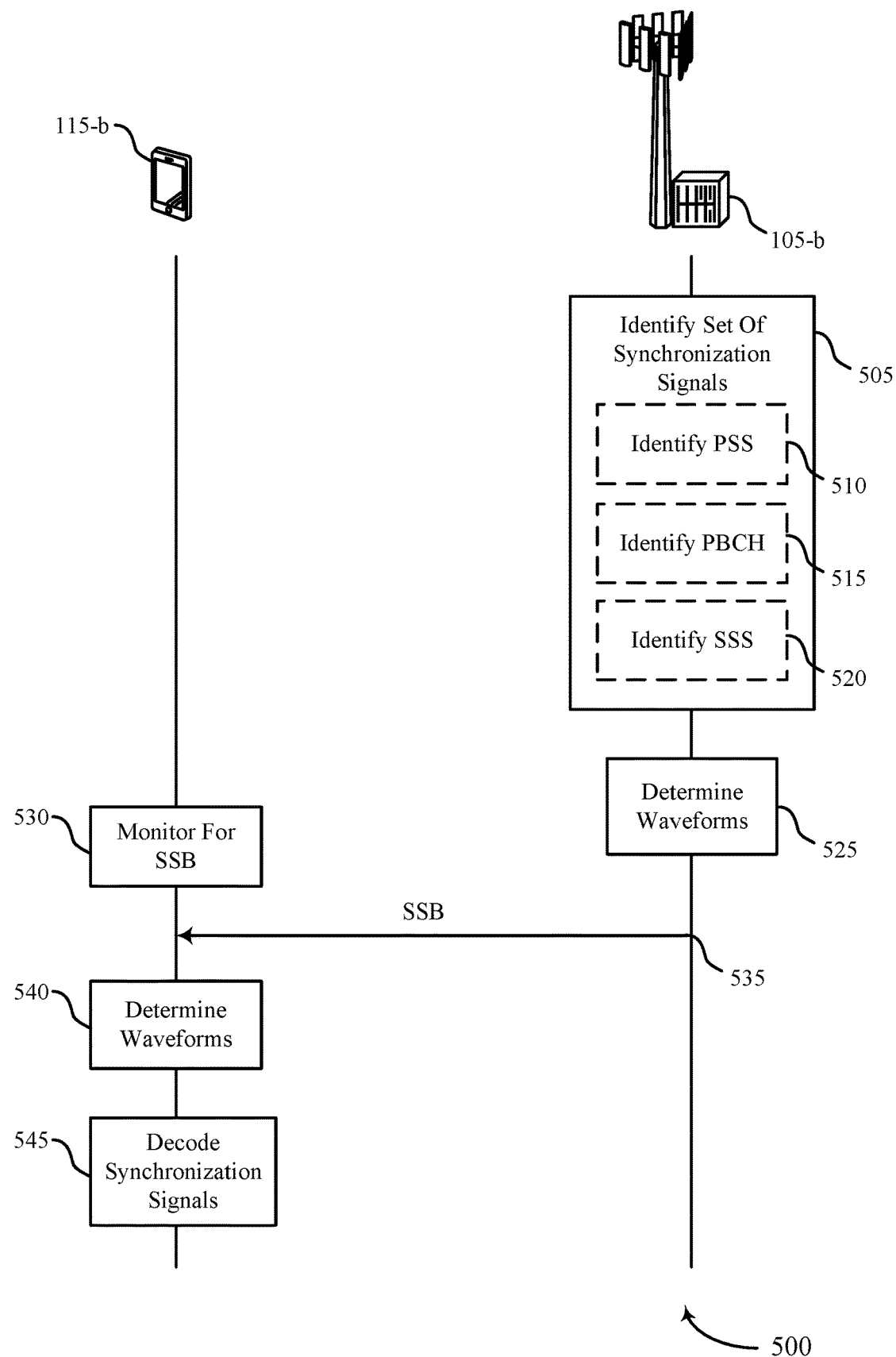
FIG. 5 illustrates an example of a process flow that supports SSB design in accordance with aspects of the present disclosure.

FIG. 5 illustrates an example of a process flow 500 that supports SSB design in accordance with aspects of the present disclosure. In some examples, process flow 500 may implement aspects of wireless communications system 100 or 200 and may be implemented by a UE 115-b and a base station 105-b, which may be examples of a UE 115 and a base station 105 described with reference to FIGS. 1-4. Process flow 500 may also implement aspects of SSB configurations 301 or 302, as well as aspects of DMRS configurations 401 or 402. In some cases, base station 105-b may transmit one or more low-PAPR SSBs to UE 115-b and UE 115-b may process the low-PAPR SSBs (e.g., decode in accordance with a low-PAPR SSB configuration) in order to receive system information and begin communications with base station 105-b.

In the following description of the process flow 500, the operations between UE 115-b and base station 105-b may be transmitted in a different order than the order shown, or the operations performed by base station 105-b and UE 115-b may be performed in different orders or at different times. Some operations may also be left out of the process flow 500, or other operations may be added to the process flow 500. It is to be understood that while base station 105-b and UE 115-b are shown performing a number of the operations of process flow 500, any wireless device may perform the operations shown.

At 505, base station 105-b may identify a set of synchronization signals (e.g., PSS, SSS, or PBCH) for an SSB. In some cases, any parameter associated with the set of synchronization signals may be a function of a synchronization raster point (e.g., including parameters described herein).

At 510, base station 105-*b* may identify a PSS of the set of synchronization signals. Base station 105-*b* may determine a sequence of a set of sequences for the PSS, where the sequence may indicate the waveform for an SSS of the set of synchronization signals or a PBCH of the SSB. In some cases, the set of sequences may include one sequence or more than three sequences. Base station 105-*b* may also determine a length of the sequence for the PSS, where the length may be based on a length (e.g., bandwidth, sequence length, number of subcarriers) of one or more other synchronization signals (e.g., SSS, PBCH) of the set of synchronization signals, a number of resources (e.g., REs) allocated for the PSS, a number of resources (e.g., REs) allocated for the one or more other synchronization signals of the set of synchronization signals, or any combination thereof.

At 515, base station 105-*b* may identify the PBCH of the SSB. Base station 105-*b* may identify a DMRS for the PBCH and may map the DMRS and the PBCH to one or more symbols (e.g., OFDM symbol) of the SSB based on a DMRS pattern, where the DMRS pattern may define one or more sets of multiple contiguous REs for placement of the DMRS. In some cases, the one or more sets of multiple contiguous REs and a number of the multiple contiguous REs may be based on a number of RBs allocated for the PBCH. In some cases, base station 105-*b* may multiplex the DMRS according to a TDM scheme on one or more additional symbols of the SSB. In some cases, base station 105-*b* may include a first number of bits in the DMRS, where the first number of bits may indicate an index of the SSB, and may include a second number of bits in a payload of the PBCH, where the first and second numbers of bits may be different and one of the first or second numbers of bits may be different from three bits.

At 520, base station 105-*b* may identify the SSS of the set of synchronization signals. In some cases, base station 105-*b* may multiplex a DMRS for a PBCH with the SSS according to a DMRS pattern, where the DMRS pattern may indicate a set of multiple contiguous REs for placement of the DMRS. In some cases, base station 105-*b* may map the SSS to a symbol (e.g., OFDM symbol) of the SSB independent of other synchronization signals (e.g., PBCH, PSS) of the set of synchronization signals. In some cases, the symbol to which the SSS may be mapped may include a same number of REs (e.g., corresponding to a number RBs or a bandwidth) as other symbols of the SSB to which one or more other synchronization signals (e.g., PSS, PBCH) of the set of synchronization signals are mapped.

In some cases, base station 105-*b* may determine a sequence of a set of sequences for the SSS, where the sequence may include a π/2 BPSK sequence, an m-sequence, or a Zadoff-Chu sequence. In some cases, base station 105-*b* may include information in resources allocated to the SSS, where the information may include sidelink information, IAB information, relay information, V2X information, or any combination thereof.

At 525, base station 105-*b* may determine a waveform (e.g., OFDM, DFT-s-OFDM, or SC-FDM) from a set of waveforms for each synchronization signal of the set of synchronization signals, where the set of waveforms may be waveforms having a PAPR below a threshold. In some cases, base station 105-*b* may determine the waveform for the SSS, where the waveform may include a DFT-s-OFDM waveform.

At 530, UE 115-*b* may monitor resources for the SSB from base station 105-*b*, where the SSB includes the set of synchronization signals.

At 535, base station 105-*b* may transmit the SSB including the set of synchronization signals using the determined waveforms. In some cases, base station 105-*b* may indicate information corresponding to the SSB in a SIB (e.g., SIB1), where the information may include an indication of one or more groups of SSBs (e.g., indicated by SSB indices) and one or more sets of SSBs (e.g., indicated by SSB indices) of the one or more groups of SSBs transmitted by base station 105-*b*.

At 540, UE 115-*b* may determine a waveform from a set of waveforms for each synchronization signal of the set of synchronization signals, where the set of waveforms may be waveforms having a PAPR below a threshold. In some cases, UE 115-*b* may identify a PSS of the set of synchronization signals. In some cases, UE 115-*b* may determine a sequence of a set of sequences for the PSS, where the sequence may indicate the waveform for the SSS of the set of synchronization signals or the PBCH of the SSB. UE 115-*b* may also determine a length of the sequence for the PSS, where the length may be based on a length (e.g., bandwidth, sequence length, number of subcarriers) of one or more other synchronization signals (e.g., SSS, PBCH) of the set of synchronization signals, a number of resources (e.g., REs) allocated for the PSS, a number of resources (e.g., REs) allocated for the one or more other synchronization signals of the set of synchronization signals, or any combination thereof.

In some cases, UE 115-*b* may identify an SSS of the set of synchronization signals. In some cases, UE 115-*b* may determine the waveform for the SSS, where the waveform may include a DFT-s-OFDM waveform. In some cases, UE 115-*b* may identify a DMRS for the PBCH multiplexed with the SSS based on a DMRS pattern, where the DMRS pattern may indicate a set of multiple contiguous REs for placement of the DMRS. In some cases, the symbol to which the SSS is mapped may include a same number of REs (e.g., corresponding to a number RBs or a bandwidth) as other symbols of the SSB to which one or more other synchronization signals (e.g., PSS, PBCH) of the set of synchronization signals are mapped. In some cases, UE 115-*b* may determine a sequence of a set of sequences for the SSS, where the sequence may include a π/2 BPSK sequence, an m-sequence, or a Zadoff-Chu sequence. In some cases, UE 115-*b* may filter the sequence for the SSS as a function of a synchronization raster point. In some cases, UE 115-*b* may identify information in resources allocated to the SSS, where the information may include sidelink information, IAB information, relay information, V2X information, or any combination thereof.

In some cases, UE 115-*b* may identify a DMRS for the PBCH of the SSB based on a DMRS pattern, where the DMRS pattern defines one or more sets of multiple contiguous REs for the DMRS. In some cases, the one or more sets of multiple contiguous REs and a number of the multiple contiguous REs may be based on a number of RBs allocated for the PBCH. In some cases, UE 115-*b* may identify information corresponding to the SSB in the SIB (e.g., SIB1), where the information may include an indication of one or more groups of SSBs (e.g., indicated by SSB indices) and one or more sets of SSBs (e.g., indicated by SSB indices) of the one or more groups of SSBs transmitted by base station 105-*b*.

At 545, UE 115-*b* may decode one or more synchronization signals of the set of synchronization signals based on the monitoring and the determined waveforms. In some cases, UE 115-b may decode the PBCH of the SSB based on the PSS, where the PSS may have a one-to-one correlation with the SSS of the set of synchronization signals. In some cases, UE 115-b may decode the PBCH of the SSB based on the SSS.

Figure 6:
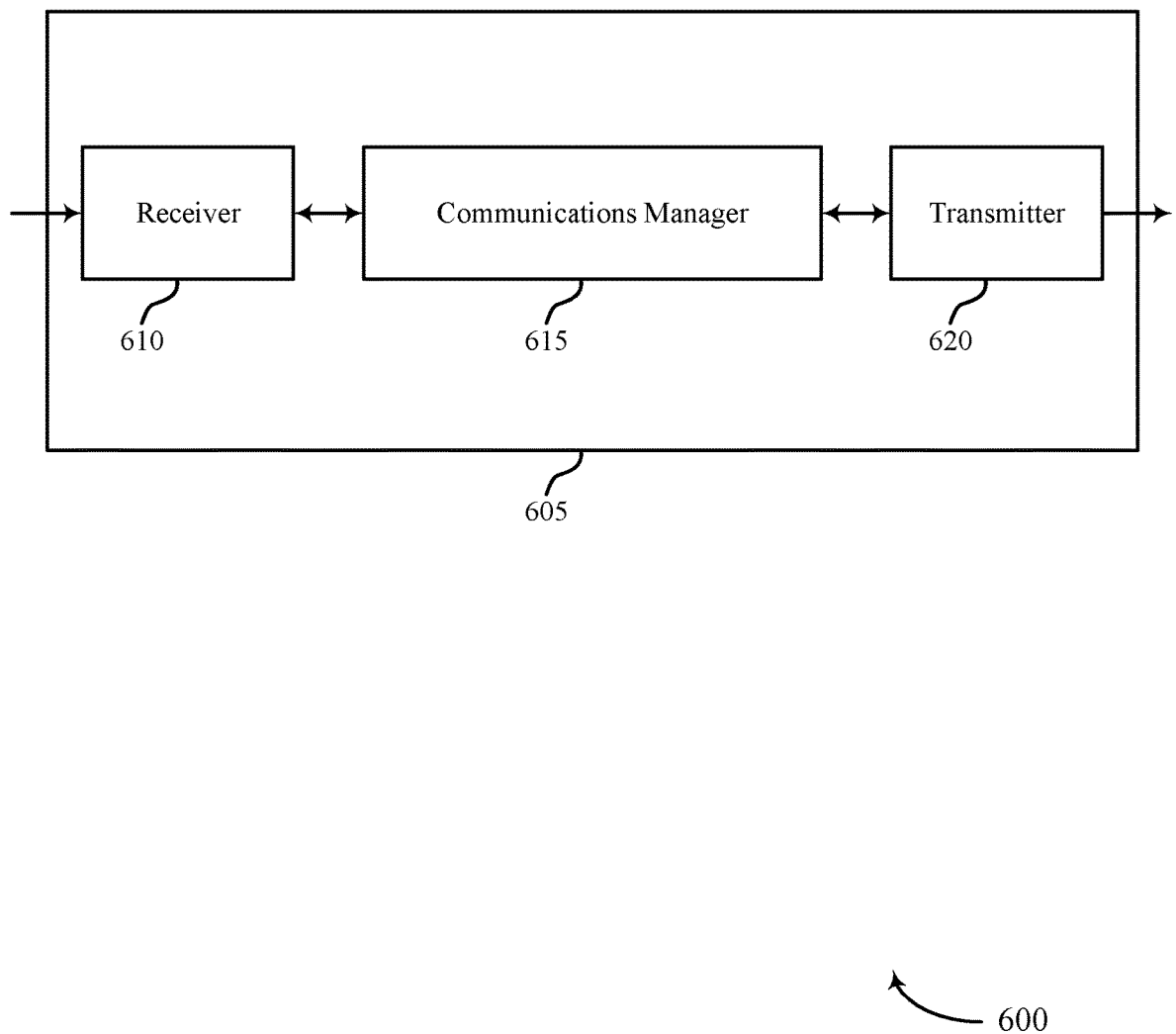
FIGS. 6 and 7 show block diagrams of devices that support SSB design in accordance with aspects of the present disclosure.

FIG. 6 shows a block diagram 600 of a device 605 that supports SSB design in accordance with aspects of the present disclosure. The device 605 may be an example of aspects of a UE 115 as described herein. The device 605 may include a receiver 610, a communications manager 615, and a transmitter 620. The device 605 may also include one or more processors, memory coupled with the one or more processors, and instructions stored in the memory that are executable by the one or more processors to support the SSB design features discussed herein. Each of these components may be in communication with one another (e.g., via one or more buses).

The receiver 610 may receive information such as packets, user data, or control information associated with various information channels (e.g., control channels, data channels, and information related to intra-device collision handling). Information may be passed on to other components of the device 605. The receiver 610 may be an example of aspects of the transceiver 920 described with reference to FIG. 9. The receiver 610 may utilize a single antenna or a set of antennas.

The communications manager 615 may monitor resources for an SSB from a base station, the SSB including a set of synchronization signals, determine a waveform from a set of waveforms for each synchronization signal of the set of synchronization signals, where the set of waveforms are waveforms having a PAPR below a threshold, and decode one or more synchronization signals of the set of synchronization signals based on the monitoring and the determined waveforms. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 615 may be implemented as an integrated circuit or chipset for a mobile device modem, and the receiver 605 and transmitter 620 may be implemented as analog components (e.g., amplifiers, filters, or antennas) coupled with the mobile device modem to enable wireless transmission and reception over one or more bands.

The actions performed by the communications manager 615 as described herein may be implemented to realize one or more potential advantages. For example, communications manager 615 may increase communication reliability and accuracy at a UE 115 by lowering the PAPR of high-frequency SSB communications such that the UE 115 may receive and decode the data transmitted in the communications. Similarly, communications manager 615 simplify communications at a UE 115 such that low-PAPR SSBs may be more uniform and therefore, allows for less processing power. The improvements in communication accuracy and reliability may further save power and increase battery life at a UE 115 (e.g., by reducing complexity and reducing a number of retransmissions to be received).

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
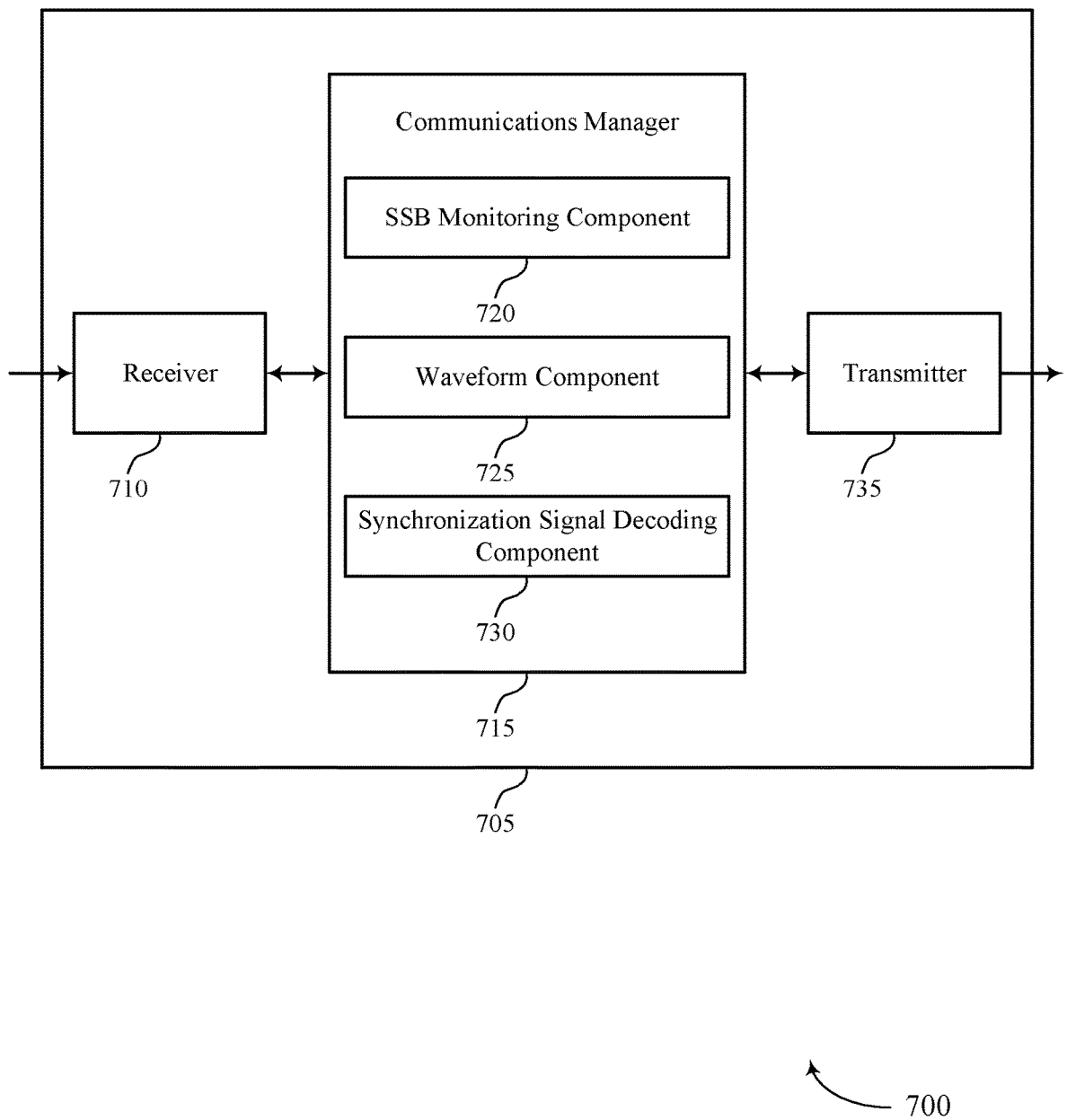

FIG. 7 shows a block diagram 700 of a device 705 that supports SSB design in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to intra-device collision handling). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an SSB monitoring component 720, a waveform component 725, and a synchronization signal decoding component 730. The communications manager 715 may be an example of aspects of the communications manager 910 described herein.

The SSB monitoring component 720 may monitor resources for an SSB from a base station, the SSB including a set of synchronization signals. The waveform component 725 may determine a waveform from a set of waveforms for each synchronization signal of the set of synchronization signals, where the set of waveforms are waveforms having a PAPR below a threshold. The synchronization signal decoding component 730 may decode one or more synchronization signals of the set of synchronization signals based on the monitoring and the determined waveforms.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

A processor of a UE 115 (e.g., controlling the receiver 710, the transmitter 735, or the transceiver 920 as described with reference to FIG. 9) may increase communication reliability and accuracy by lowering the PAPR of high-frequency SSB communications (e.g., via implementation of system components described with reference to FIG. 8). Further, the processor of UE 115 may identify one or more aspects of a low-PAPR SSB configuration to perform the processes described herein. The processor of the UE 115 may use the low-PAPR SSB configuration to simplify SSB communications and improve communication accuracy and reliability to further save power and increase battery life at the UE 115 (e.g., by reducing complexity and reducing a number of retransmissions to be received).

In some cases, SSB monitoring component 720, waveform component 725, and synchronization signal decoding component 730 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of SSB monitoring component 720, waveform component 725, and synchronization signal decoding component 730 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
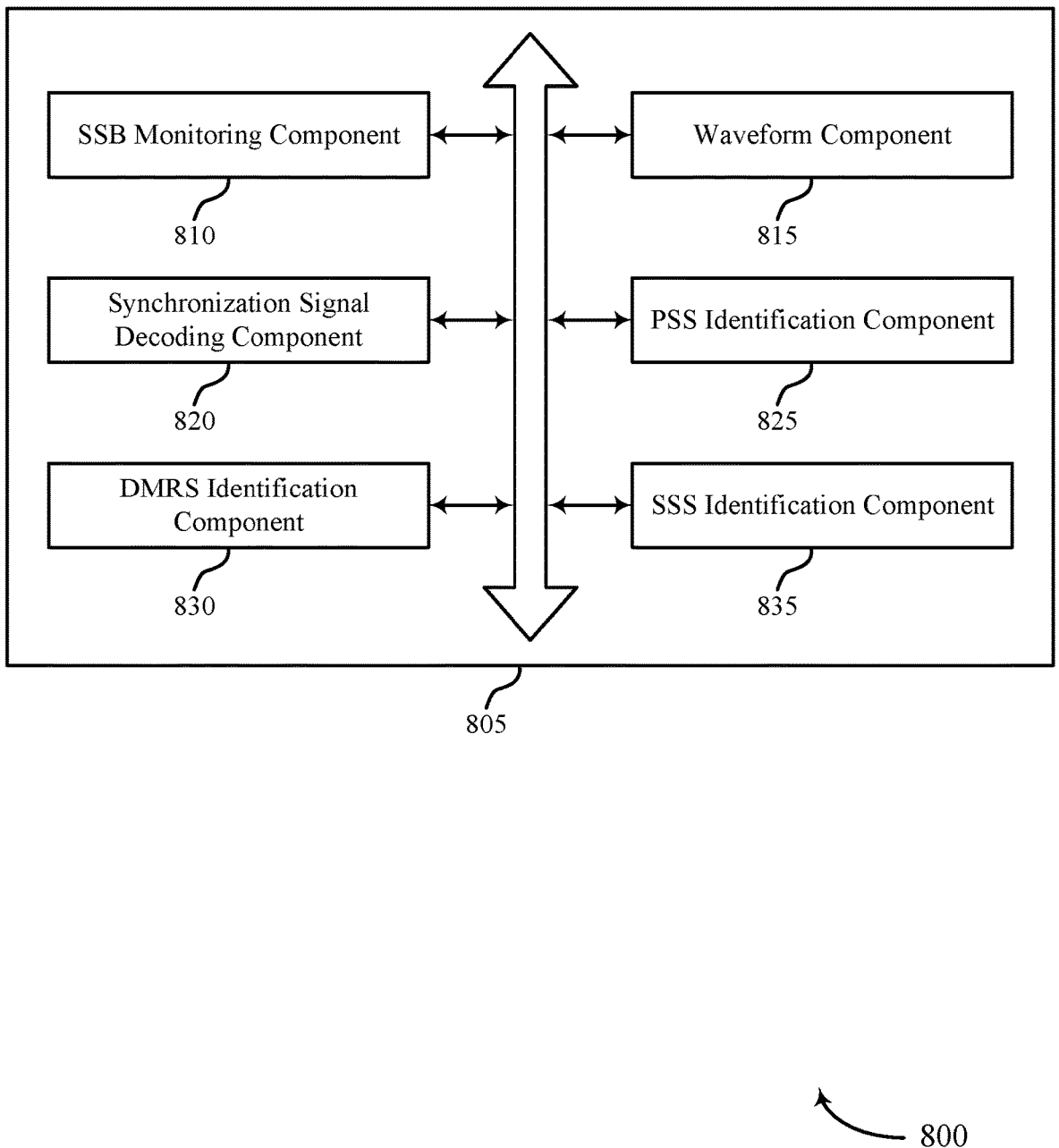
FIG. 8 shows a block diagram of a communications manager that supports SSB design in accordance with aspects of the present disclosure.

FIG. 8 shows a block diagram 800 of a communications manager 805 that supports SSB design in accordance with aspects of the present disclosure. The communications manager 805 may be an example of aspects of a communications manager 615, a communications manager 715, or a communications manager 910 described herein. The communications manager 805 may include an SSB monitoring component 810, a waveform component 815, a synchronization signal decoding component 820, a PSS identification component 825, a DMRS identification component 830, and an SSS identification component 835. Each of these modules may communicate, directly or indirectly, with one another (e.g., via one or more buses).

The SSB monitoring component 810 may monitor resources for an SSB from a base station, the SSB including a set of synchronization signals. In some examples, identifying information corresponding to the SSB in a SIB, where the information includes an indication of one or more groups of SSBs and one or more sets of SSBs of the one or more groups of SSBs for transmission by the base station. In some cases, a DMRS for a PBCH of the SSB, a number of symbols for an independent SSS, a number of SSBs of a synchronization signal burst period, or any combination thereof is a function of a synchronization raster point.

The waveform component 815 may determine a waveform from a set of waveforms for each synchronization signal of the set of synchronization signals, where the set of waveforms are waveforms having a PAPR below a threshold. In some examples, determining the waveform for a PBCH of the SSB, where the waveform includes a DFT-s-OFDM waveform. In some examples, the waveform component 815 may determine the waveform from the set of waveforms for each synchronization signal of the set of synchronization signals based on a synchronization raster point.

The synchronization signal decoding component 820 may decode one or more synchronization signals of the set of synchronization signals based on the monitoring and the determined waveforms. In some examples, the synchronization signal decoding component 820 may decode a PBCH of the SSB based on the SSS.

The PSS identification component 825 may identify a PSS of the set of synchronization signals. In some examples, the PSS identification component 825 may determine a sequence of a set of sequences for the PSS, where the sequence indicates the waveform for an SSS of the set of synchronization signals or a PBCH of the SSB. In some examples, the PSS identification component 825 may decode the PBCH of the SSB based on the PSS, where the PSS has a one-to-one correlation with the SSS of the set of synchronization signals. In some examples, the PSS identification component 825 may determine a length of a sequence for a PSS of the set of synchronization signals, where the length is based on a length of one or more other synchronization signals of the set of synchronization signals, a number of resources allocated for the PSS, a number of resources allocated for the one or more other synchronization signals of the set of synchronization signals, or any combination thereof.

The DMRS identification component 830 may identify a DMRS for a PBCH multiplexed with an SSS of the set of synchronization signals based on a DMRS pattern, where the DMRS pattern indicates a set of multiple contiguous REs for placement of the DMRS. In some examples, the DMRS identification component 830 may identify a DMRS for a PBCH of the SSB based on a DMRS pattern, where the DMRS pattern defines one or more sets of multiple contiguous REs for the DMRS. In some cases, the one or more sets of multiple contiguous REs and a number of the multiple contiguous REs is based on a number of RBs allocated for the PBCH. In some cases, the DMRS is multiplexed with an SSS of the set of synchronization signals based on the DMRS pattern.

The SSS identification component 835 may identify an SSS of the set of synchronization signals. In some examples, determining the waveform for the SSS, where the waveform includes a DFT-s-OFDM waveform. In some examples, determining a sequence of a set of sequences for the SSS, where the sequence includes a $\pi/2$ BPSK sequence, an m-sequence, or a Zadoff-Chu sequence. In some examples, identifying information in resources allocated to the SSS, where the information includes sidelink information, IAB information, relay information, V2X information, or any combination thereof. In some cases, an OFDM symbol to which the SSS is mapped includes a same number of REs as other OFDM symbols of the SSB to which one or more other synchronization signals of the set of synchronization signals are mapped.

In some cases, SSB monitoring component 810, waveform component 815, synchronization signal decoding component 820, PSS identification component 825, DMRS identification component 830, and SSS identification component 835 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of SSB monitoring component 810, waveform component 815, synchronization signal decoding component 820, PSS identification component 825, DMRS identification component 830, and SSS identification component 835 discussed herein.

Figure 9:
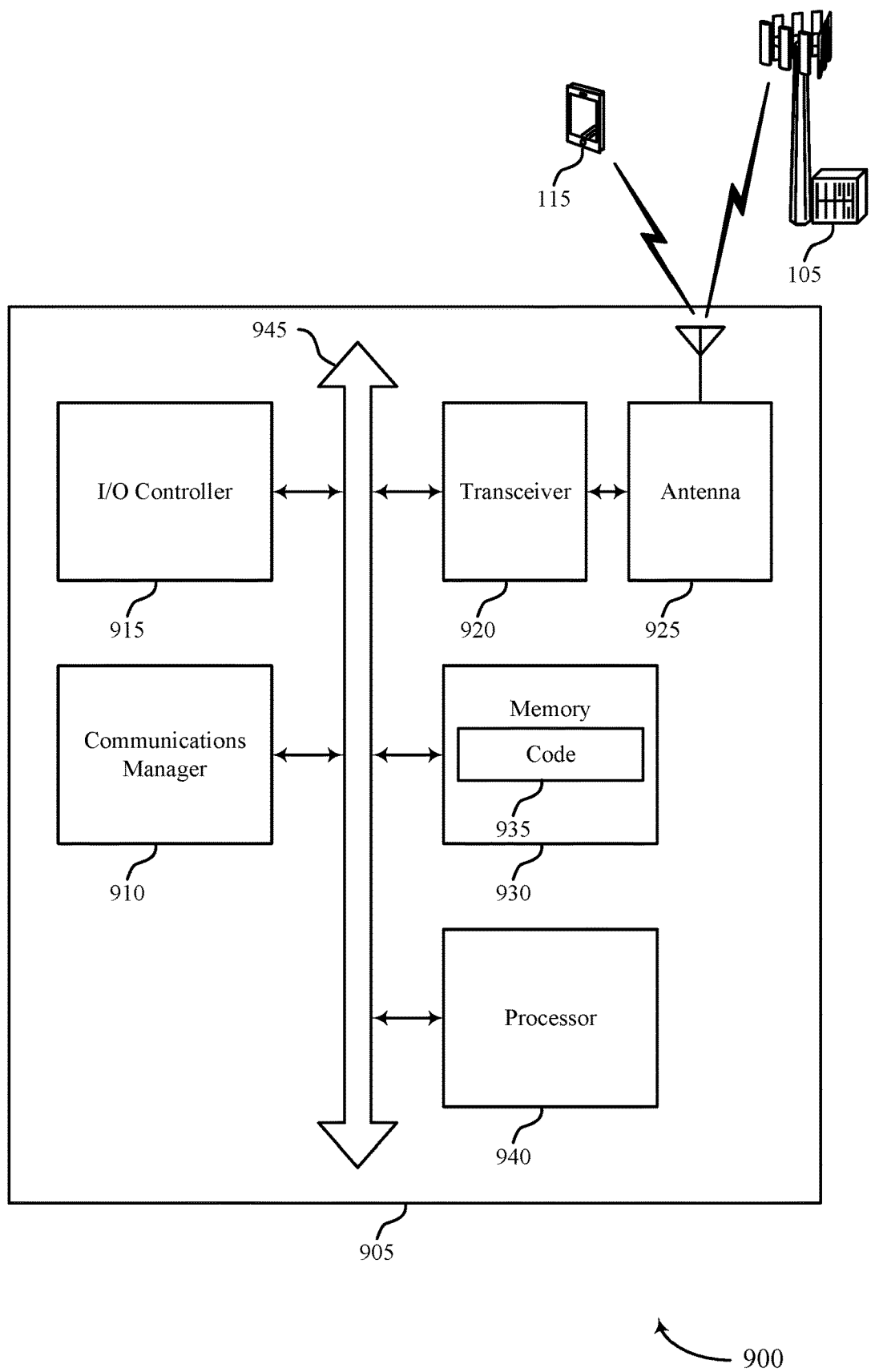
FIG. 9 shows a diagram of a system including a device that supports SSB design in accordance with aspects of the present disclosure.

FIG. 9 shows a diagram of a system 900 including a device 905 that supports SSB design in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910. These components may be in electronic communication via one or more buses (e.g., bus).

The communications manager 910 may monitor resources for an SSB from a base station, the SSB including a set of synchronization signals, determine a waveform from a set of waveforms for each synchronization signal of the set of synchronization signals, where the set of waveforms are waveforms having a PAPR below a threshold, and decode one or more synchronization signals of the set of synchronization signals based on the monitoring and the determined waveforms.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the device 905 may include a single antenna 925, or the device 905 may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting intra-device collision handling).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
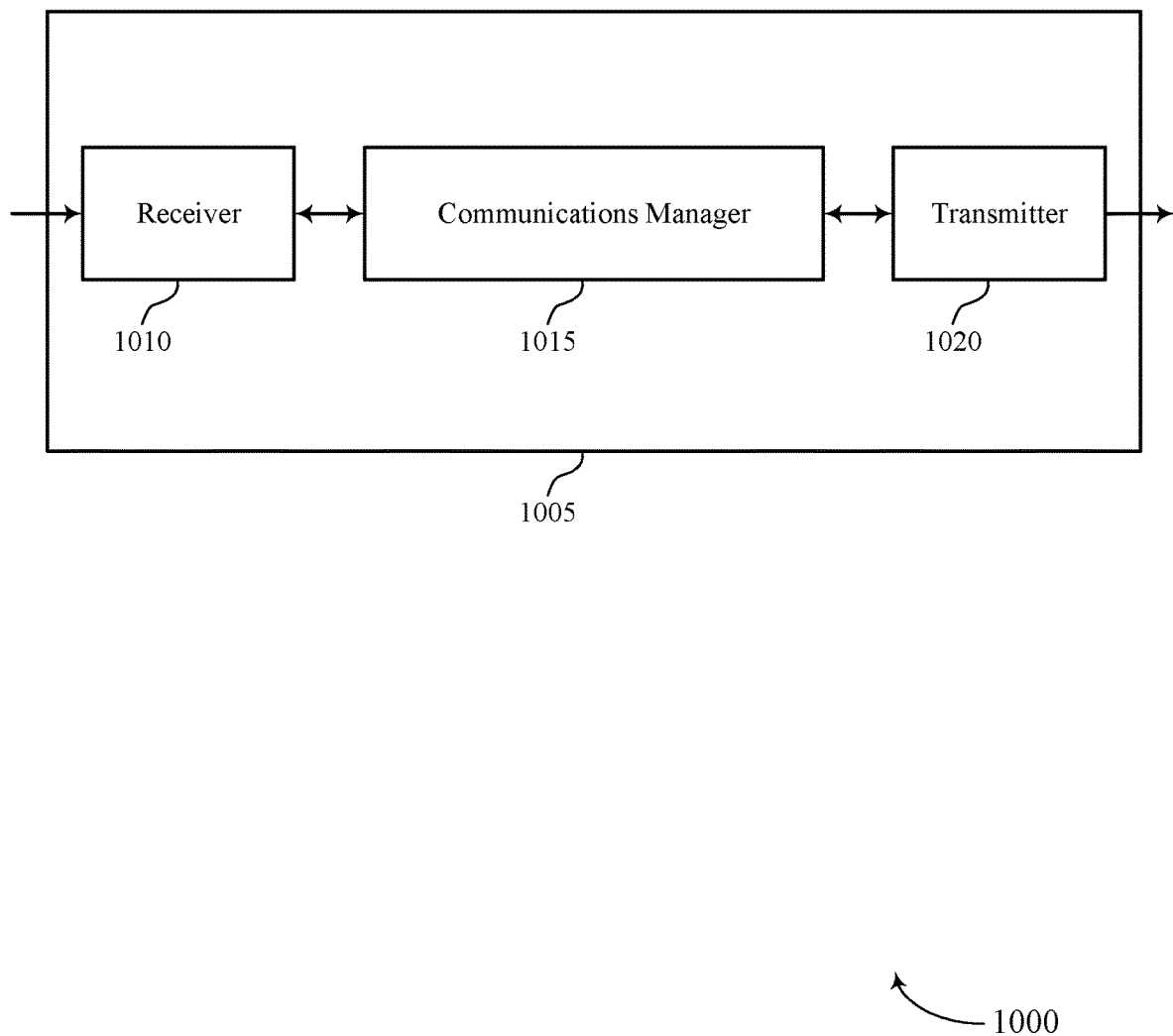
FIGS. 10 and 11 show block diagrams of devices that support SSB design in accordance with aspects of the present disclosure.

FIG. 10 shows a block diagram 1000 of a device 1005 that supports SSB design in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to SSB design). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a set of synchronization signals for an SSB, determine a waveform from a set of waveforms for each synchronization signal of the set of synchronization signals, where the set of waveforms are waveforms having a PAPR below a threshold, and transmit the SSB including the set of synchronization signals using the determined waveforms. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
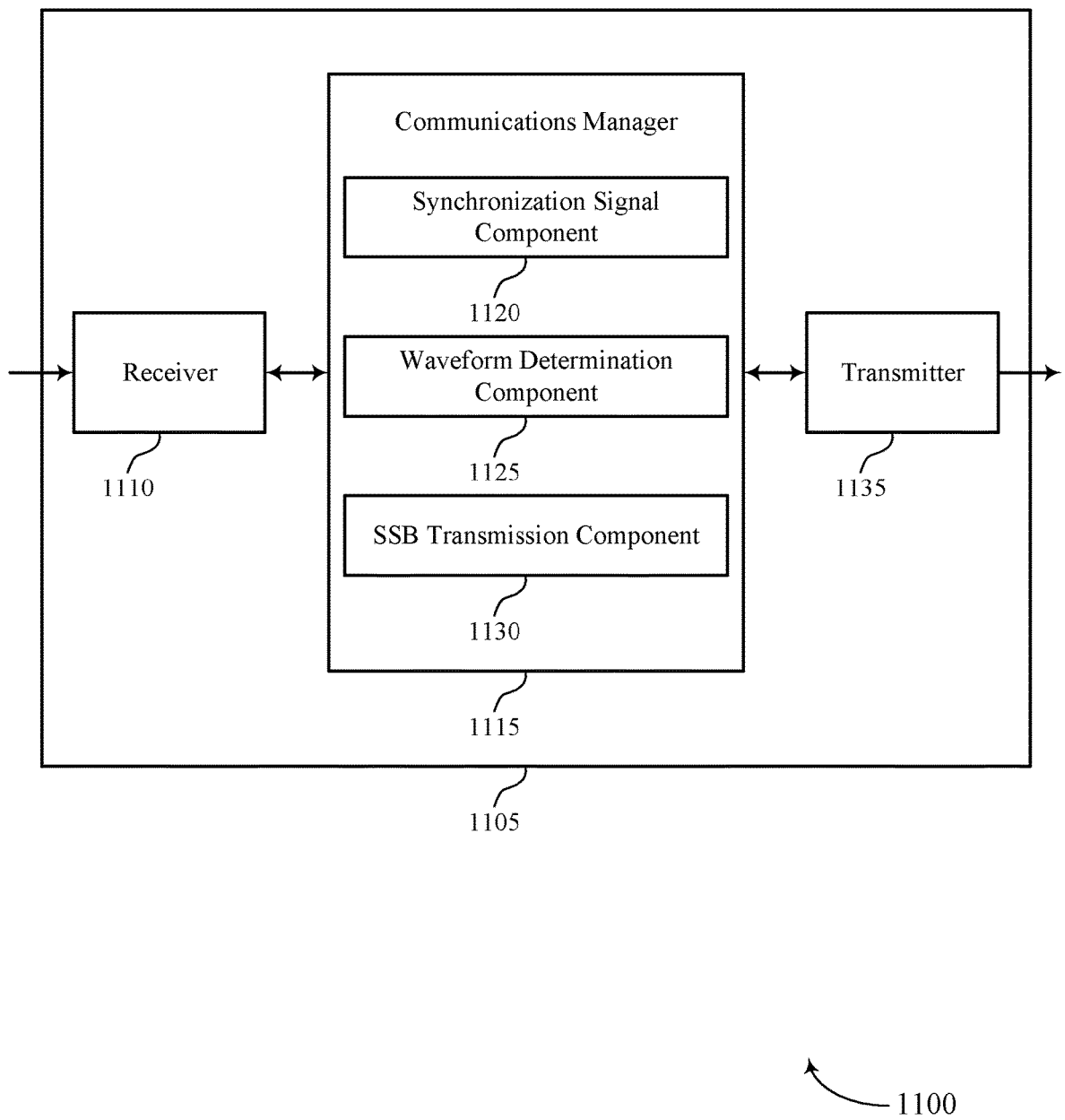

FIG. 11 shows a block diagram 1100 of a device 1105 that supports SSB design in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to SSB design). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a synchronization signal component 1120, a waveform determination component 1125, and an SSB transmission component 1130. The communications manager 1115 may be an example of aspects of the communications manager 1310 described herein.

The synchronization signal component 1120 may identify a set of synchronization signals for an SSB. The waveform determination component 1125 may determine a waveform from a set of waveforms for each synchronization signal of the set of synchronization signals, where the set of waveforms are waveforms having a PAPR below a threshold. The SSB transmission component 1130 may transmit the SSB including the set of synchronization signals using the determined waveforms.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
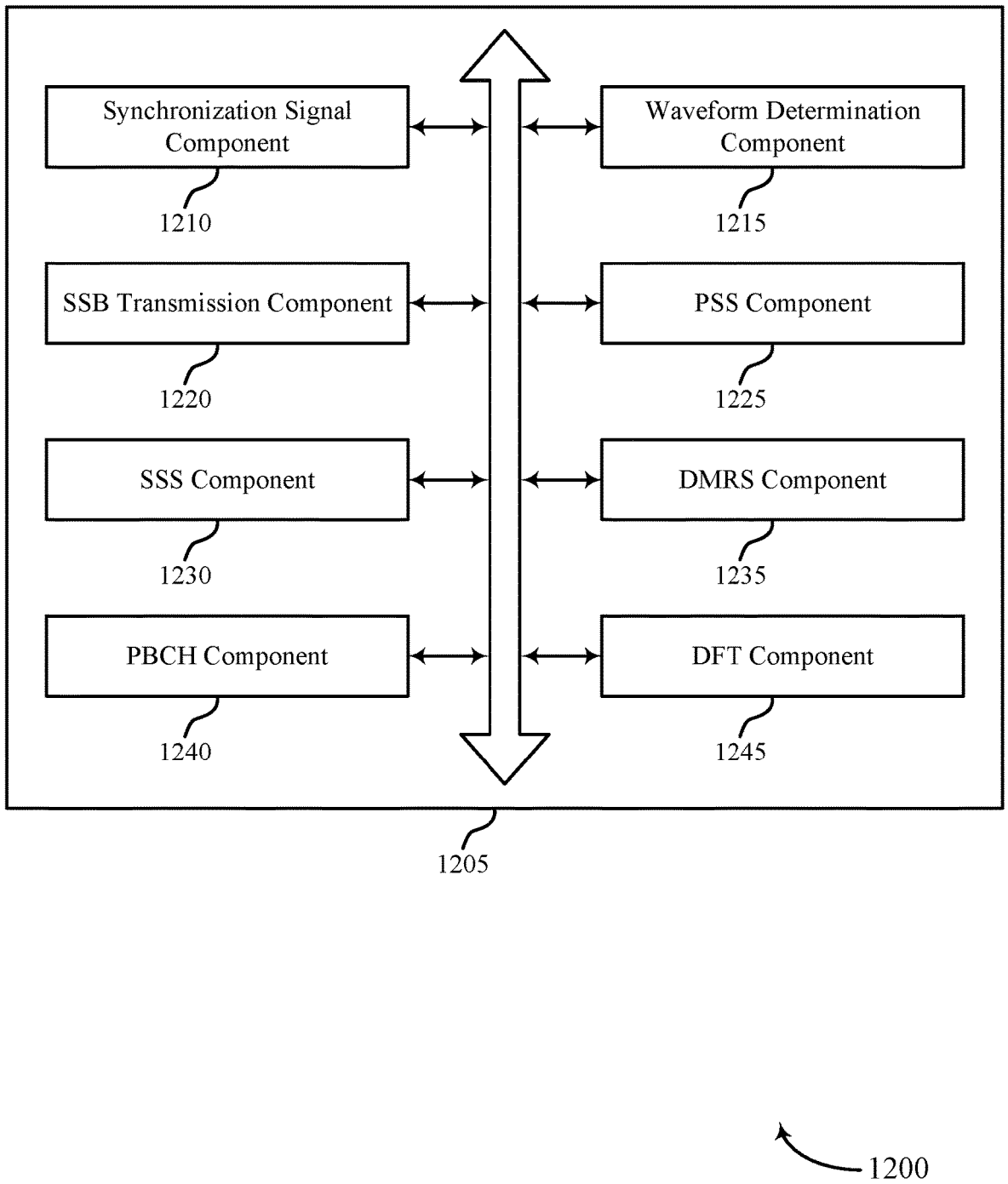
FIG. 12 shows a block diagram of a communications manager that supports SSB design in accordance with aspects of the present disclosure.

FIG. 12 shows a block diagram 1200 of a communications manager 1205 that supports SSB design in accordance with aspects of the present disclosure. The communications manager 1205 may be an example of aspects of a communications manager 1015, a communications manager 1115, or a communications manager 1310 described herein. The communications manager 1205 may include a synchronization signal component 1210, a waveform determination component 1215, an SSB transmission component 1220, a PSS component 1225, an SSS component 1230, a DMRS component 1235, a PBCH component 1240, and a DFT component 1245. Each of these modules may communicate, directly or indirectly, with one another (e.g., via one or more buses).

The synchronization signal component 1210 may identify a set of synchronization signals for an SSB. In some examples, indicating information corresponding to the SSB in a SIB, where the information includes an indication of one or more groups of SSBs and one or more sets of SSBs of the one or more groups of SSBs for transmission by the base station. In some cases, a DMRS for a PBCH of the SSB, a number of symbols for an independent SSS, a number of SSBs of a synchronization signal burst period, or any combination thereof is a function of a synchronization raster point.

The waveform determination component 1215 may determine a waveform from a set of waveforms for each synchronization signal of the set of synchronization signals, where the set of waveforms are waveforms having a PAPR below a threshold. In some examples, the waveform determination component 1215 may determine the waveform from the set of waveforms for each synchronization signal of the set of synchronization signals based on a synchronization raster point. The SSB transmission component 1220 may transmit the SSB including the set of synchronization signals using the determined waveforms.

The PSS component 1225 may identify a PSS of the set of synchronization signals. In some examples, the PSS component 1225 may determine a sequence of a set of sequences for the PSS, where the sequence indicates the waveform for an SSS of the set of synchronization signals or a PBCH of the SSB. In some examples, the PSS component 1225 may determine a length of a sequence for a PSS of the set of synchronization signals, where the length is based on a length of one or more other synchronization signals of the set of synchronization signals, a number of resources allocated for the PSS, a number of resources allocated for the one or more other synchronization signals of the set of synchronization signals, or any combination thereof. In some cases, the set of sequences includes one sequence or more than three sequences.

The SSS component 1230 may identify an SSS of the set of synchronization signals. In some examples, the SSS component 1230 may determine the waveform for the SSS, where the waveform includes a DFT-s-OFDM waveform. In some examples, the SSS component 1230 may map the SSS to an OFDM symbol of the SSB independent of other synchronization signals of the set of synchronization signals. In some examples, determining a sequence of a set of sequences for the SSS, where the sequence includes a $\pi/2$ BPSK sequence, an m-sequence, or a Zadoff-Chu sequence. In some examples, the SSS component 1230 may filter the sequence for the SSS as a function of a synchronization raster point. In some examples, including information in resources allocated to the SSS, where the information includes sidelink information, IAB information, relay information, V2X information, or any combination thereof. In some cases, the OFDM symbol to which the SSS is mapped includes a same number of REs as other OFDM symbols of the SSB to which one or more other synchronization signals of the set of synchronization signals are mapped.

The DMRS component 1235 may multiplex a DMRS for a PBCH with an SSS of the set of synchronization signals according to a DMRS pattern, where the DMRS pattern indicates a set of multiple contiguous REs for placement of the DMRS. In some examples, the DMRS component 1235 may identify a DMRS for the PBCH. In some examples, the DMRS component 1235 may include a first number of bits in the DMRS, where the first number of bits indicates an index of the SSB.

The PBCH component 1240 may determine a waveform for a PBCH of the SSB, where the waveform includes a DFT-s-OFDM waveform. In some examples, the PBCH component 1240 may identify a PBCH of the SSB. In some examples, the PBCH component 1240 may map the DMRS and the PBCH to one or more OFDM symbols of the SSB based on a DMRS pattern, where the DMRS pattern defines one or more sets of multiple contiguous REs for placement of the DMRS. In some examples, the PBCH component 1240 may multiplex the DMRS according to a time division multiplexing scheme on one or more additional OFDM symbols of the SSB. In some examples, the PBCH component 1240 may include a second number of bits in a payload of the PBCH, where at least one of the first and second numbers of bits are different from three. In some cases, the one or more sets of multiple contiguous REs and a number of the multiple contiguous REs is based on a number of RBs allocated for the PBCH.

The DFT component 1245 may perform a DFT spreading operation on the SSB to generate a DFT spread DFT-s-OFDM waveform of the SSB. In some cases, an SSS of the set of synchronization signals is multiplexed with a PBCH of the SSB.

Figure 13:
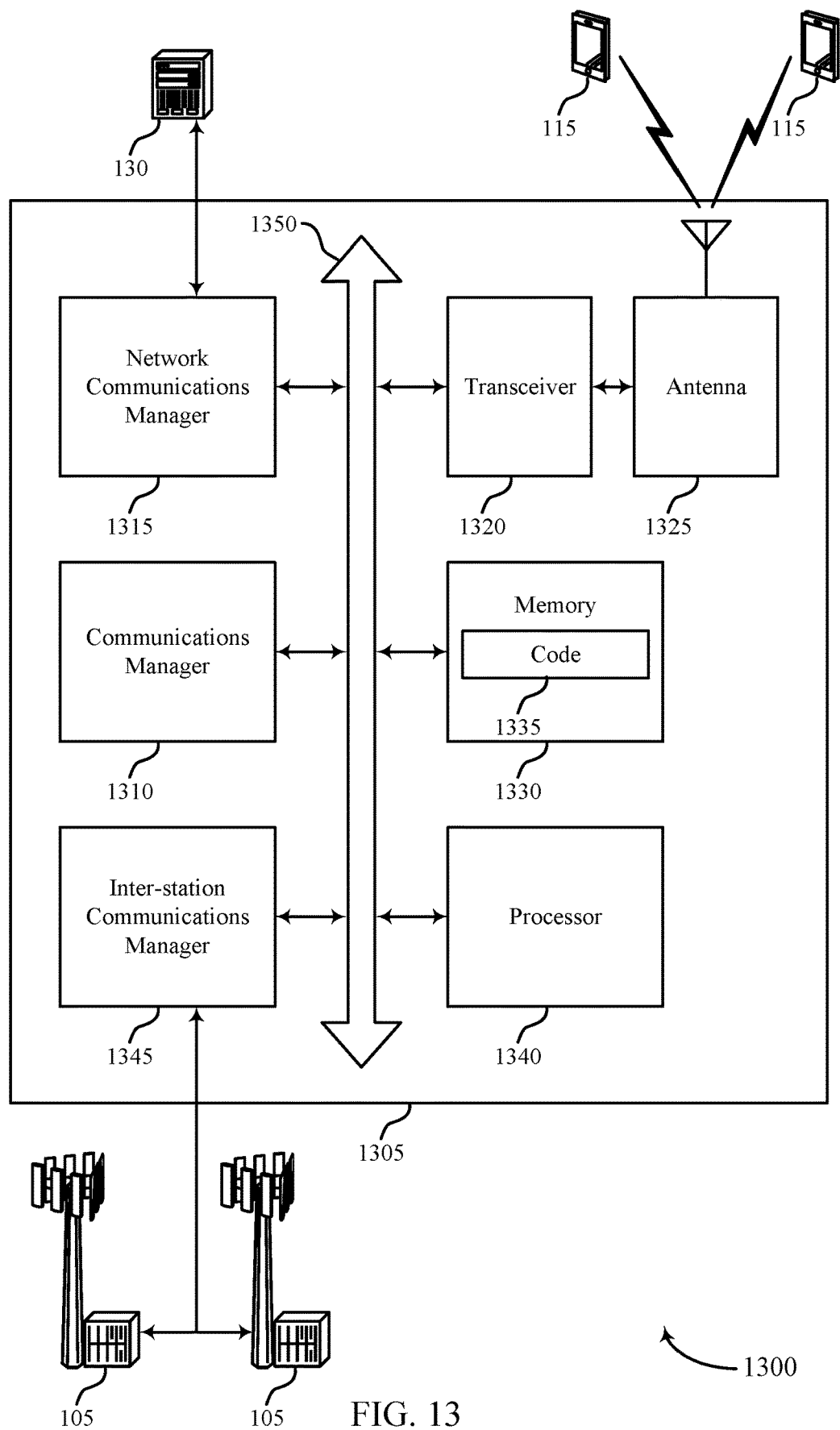
FIG. 13 shows a diagram of a system including a device that supports SSB design in accordance with aspects of the present disclosure.

FIG. 13 shows a diagram of a system 1300 including a device 1305 that supports SSB design in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a set of synchronization signals for an SSB, determine a waveform from a set of waveforms for each synchronization signal of the set of synchronization signals, where the set of waveforms are waveforms having a PAPR below a threshold, and transmit the SSB including the set of synchronization signals using the determined waveforms.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting SSB design).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
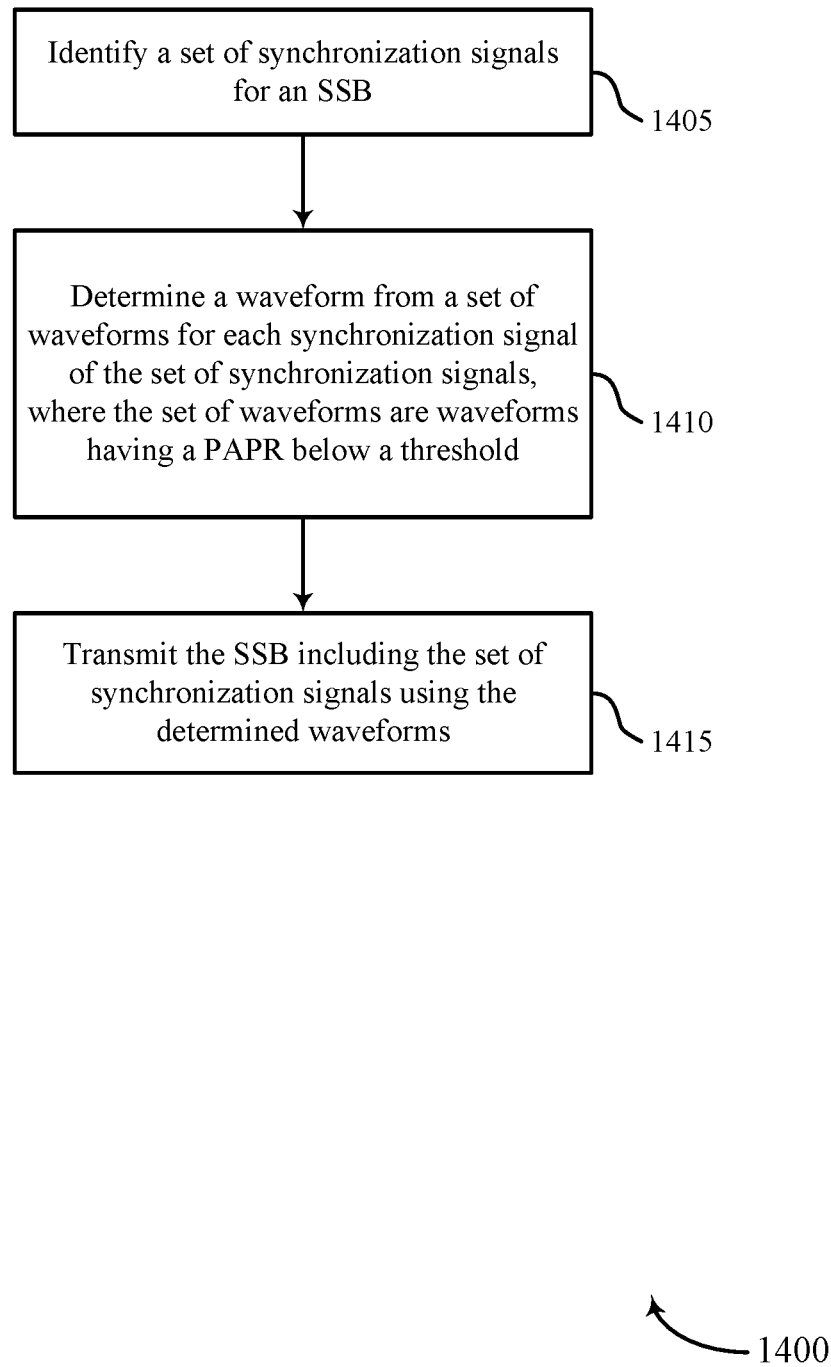
FIGS. 14 through 21 show flowcharts illustrating methods that support SSB design in accordance with aspects of the present disclosure.

FIG. 14 shows a flowchart illustrating a method 1400 that supports SSB design in accordance with aspects of the present disclosure. The operations of method 1400 may be implemented by a base station 105 or its components as described herein. For example, the operations of method 1400 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1405, the base station may identify a set of synchronization signals for an SSB. The operations of 1405 may be performed according to the methods described herein. In some examples, aspects of the operations of 1405 may be performed by a synchronization signal component as described with reference to FIGS. 10 through 13.

At 1410, the base station may determine a waveform from a set of waveforms for each synchronization signal of the set of synchronization signals, where the set of waveforms are waveforms having a PAPR below a threshold. The operations of 1410 may be performed according to the methods described herein. In some examples, aspects of the operations of 1410 may be performed by a waveform determination component as described with reference to FIGS. 10 through 13.

At 1415, the base station may transmit the SSB including the set of synchronization signals using the determined waveforms. The operations of 1415 may be performed according to the methods described herein. In some examples, aspects of the operations of 1415 may be performed by an SSB transmission component as described with reference to FIGS. 10 through 13.

Figure 15:
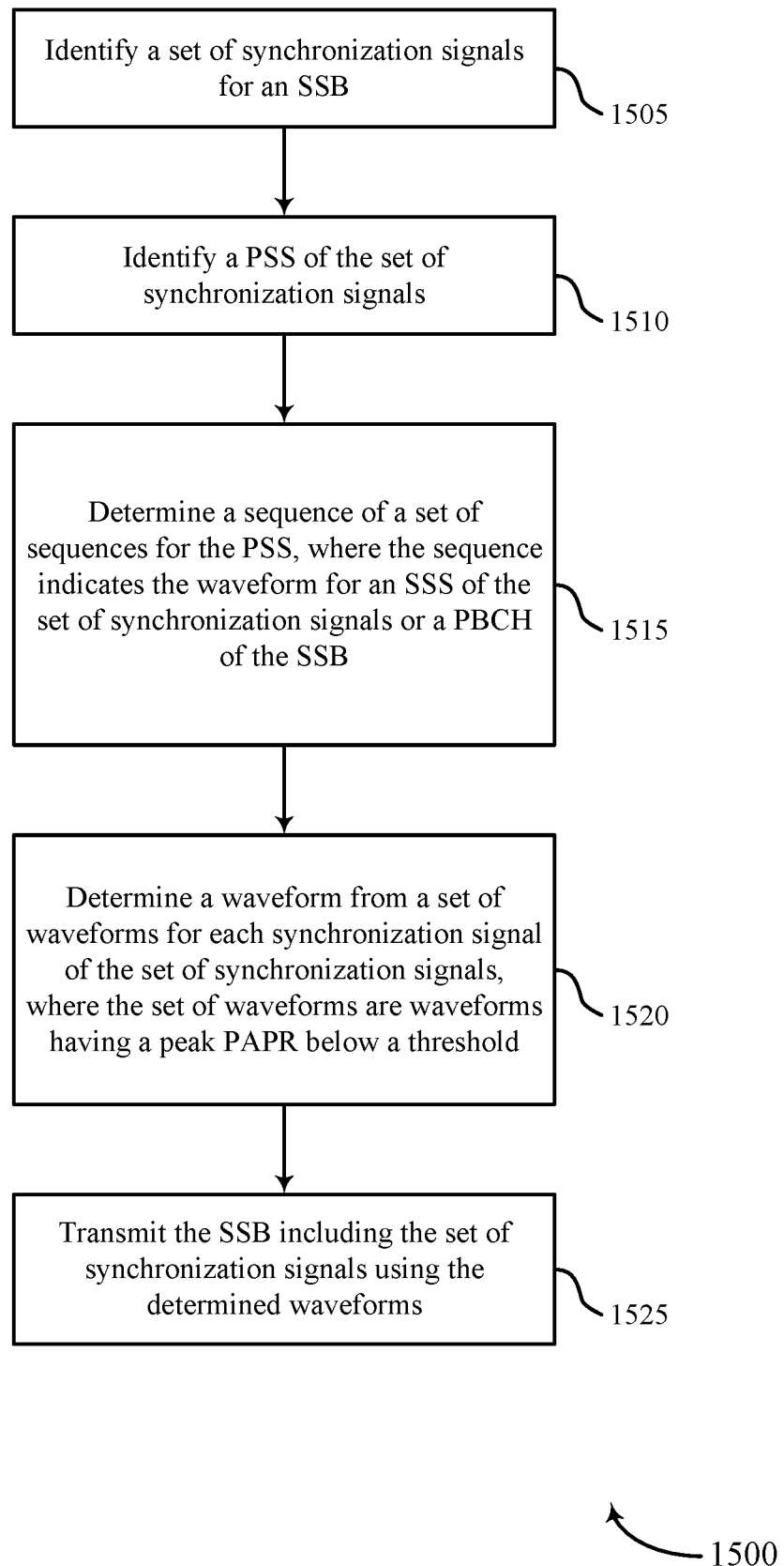

FIG. 15 shows a flowchart illustrating a method 1500 that supports SSB design in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may identify a set of synchronization signals for an SSB. The operations of 1505 may be performed according to the methods described herein. In some examples, aspects of the operations of 1505 may be performed by a synchronization signal component as described with reference to FIGS. 10 through 13.

At 1510, the base station may identify a PSS of the set of synchronization signals. The operations of 1510 may be performed according to the methods described herein. In some examples, aspects of the operations of 1510 may be performed by a PSS component as described with reference to FIGS. 10 through 13.

At 1515, the base station may determine a sequence of a set of sequences for the PSS, where the sequence indicates the waveform for an SSS of the set of synchronization signals or a PBCH of the SSB. The operations of 1515 may be performed according to the methods described herein. In some examples, aspects of the operations of 1515 may be performed by a PSS component as described with reference to FIGS. 10 through 13.

At 1520, the base station may determine a waveform from a set of waveforms for each synchronization signal of the set of synchronization signals, where the set of waveforms are waveforms having a PAPR below a threshold. The operations of 1520 may be performed according to the methods described herein. In some examples, aspects of the operations of 1520 may be performed by a waveform determination component as described with reference to FIGS. 10 through 13.

At 1525, the base station may transmit the SSB including the set of synchronization signals using the determined waveforms. The operations of 1525 may be performed according to the methods described herein. In some examples, aspects of the operations of 1525 may be performed by an SSB transmission component as described with reference to FIGS. 10 through 13.

Figure 16:
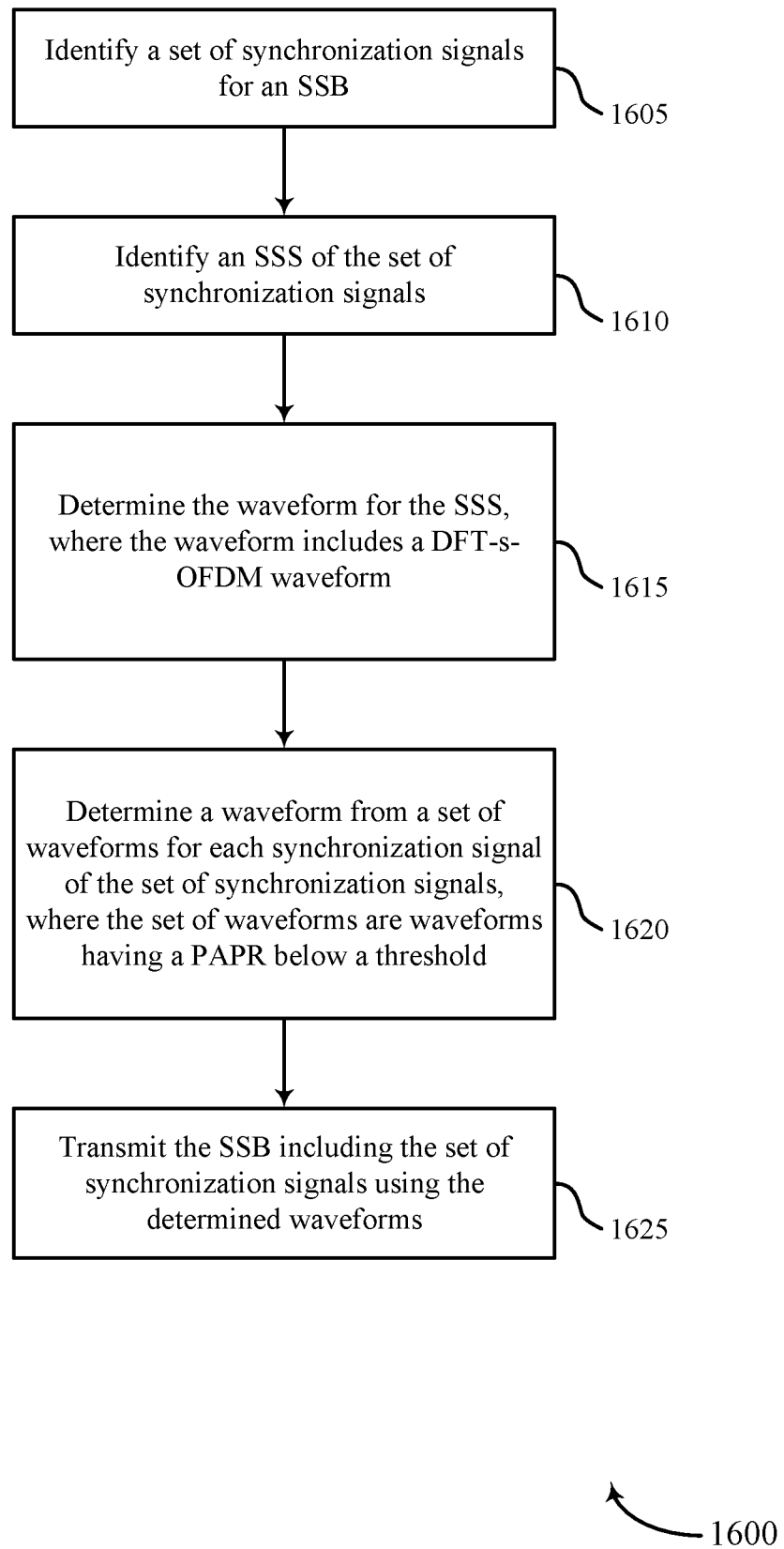

FIG. 16 shows a flowchart illustrating a method 1600 that supports SSB design in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may identify a set of synchronization signals for an SSB. The operations of 1605 may be performed according to the methods described herein. In some examples, aspects of the operations of 1605 may be performed by a synchronization signal component as described with reference to FIGS. 10 through 13.

At 1610, the base station may identify an SSS of the set of synchronization signals. The operations of 1610 may be performed according to the methods described herein. In some examples, aspects of the operations of 1610 may be performed by an SSS component as described with reference to FIGS. 10 through 13.

At 1615, the base station may determine the waveform for the SSS, where the waveform includes a DFT-s-OFDM waveform. The operations of 1615 may be performed according to the methods described herein. In some examples, aspects of the operations of 1615 may be performed by an SSS component as described with reference to FIGS. 10 through 13.

At 1620, the base station may determine a waveform from a set of waveforms for each synchronization signal of the set of synchronization signals, where the set of waveforms are waveforms having a PAPR below a threshold. The operations of 1620 may be performed according to the methods described herein. In some examples, aspects of the operations of 1620 may be performed by a waveform determination component as described with reference to FIGS. 10 through 13.

At 1625, the base station may transmit the SSB including the set of synchronization signals using the determined waveforms. The operations of 1625 may be performed according to the methods described herein. In some examples, aspects of the operations of 1625 may be performed by an SSB transmission component as described with reference to FIGS. 10 through 13.

Figure 17:
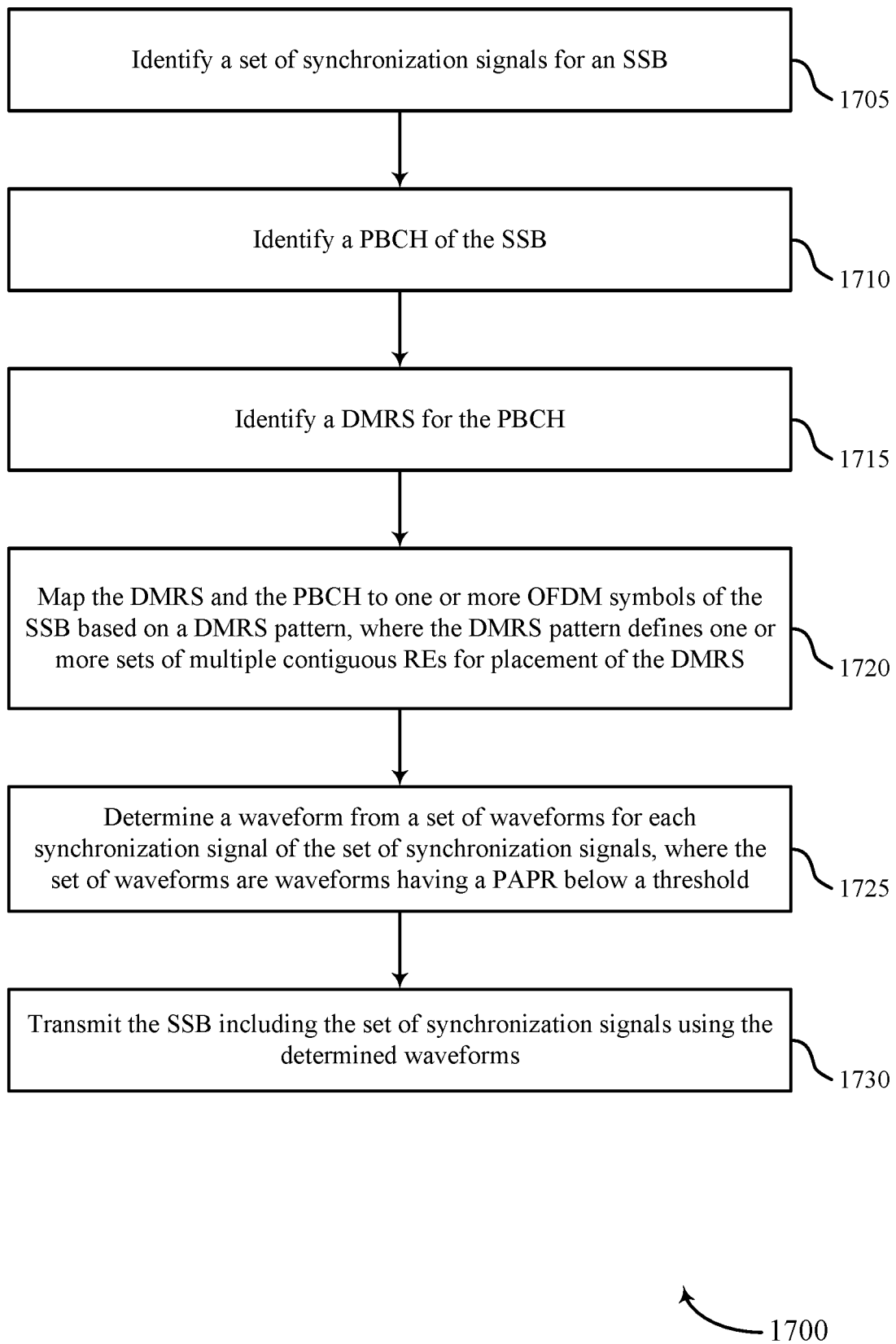

FIG. 17 shows a flowchart illustrating a method 1700 that supports SSB design in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify a set of synchronization signals for an SSB. The operations of 1705 may be performed according to the methods described herein. In some examples, aspects of the operations of 1705 may be performed by a synchronization signal component as described with reference to FIGS. 10 through 13.

At 1710, the base station may identify a PBCH of the SSB. The operations of 1710 may be performed according to the methods described herein. In some examples, aspects of the operations of 1710 may be performed by a PBCH component as described with reference to FIGS. 10 through 13.

At 1715, the base station may identify a DMRS for the PBCH. The operations of 1715 may be performed according to the methods described herein. In some examples, aspects of the operations of 1715 may be performed by a DMRS component as described with reference to FIGS. 10 through 13.

At 1720, the base station may map the DMRS and the PBCH to one or more OFDM symbols of the SSB based on a DMRS pattern, where the DMRS pattern defines one or more sets of multiple contiguous REs for placement of the DMRS. The operations of 1720 may be performed according to the methods described herein. In some examples, aspects of the operations of 1720 may be performed by a PBCH component as described with reference to FIGS. 10 through 13.

At 1725, the base station may determine a waveform from a set of waveforms for each synchronization signal of the set of synchronization signals, where the set of waveforms are waveforms having a PAPR below a threshold. The operations of 1725 may be performed according to the methods described herein. In some examples, aspects of the operations of 1725 may be performed by a waveform determination component as described with reference to FIGS. 10 through 13.

At 1730, the base station may transmit the SSB including the set of synchronization signals using the determined waveforms. The operations of 1730 may be performed according to the methods described herein. In some examples, aspects of the operations of 1730 may be performed by an SSB transmission component as described with reference to FIGS. 10 through 13.

Figure 18:
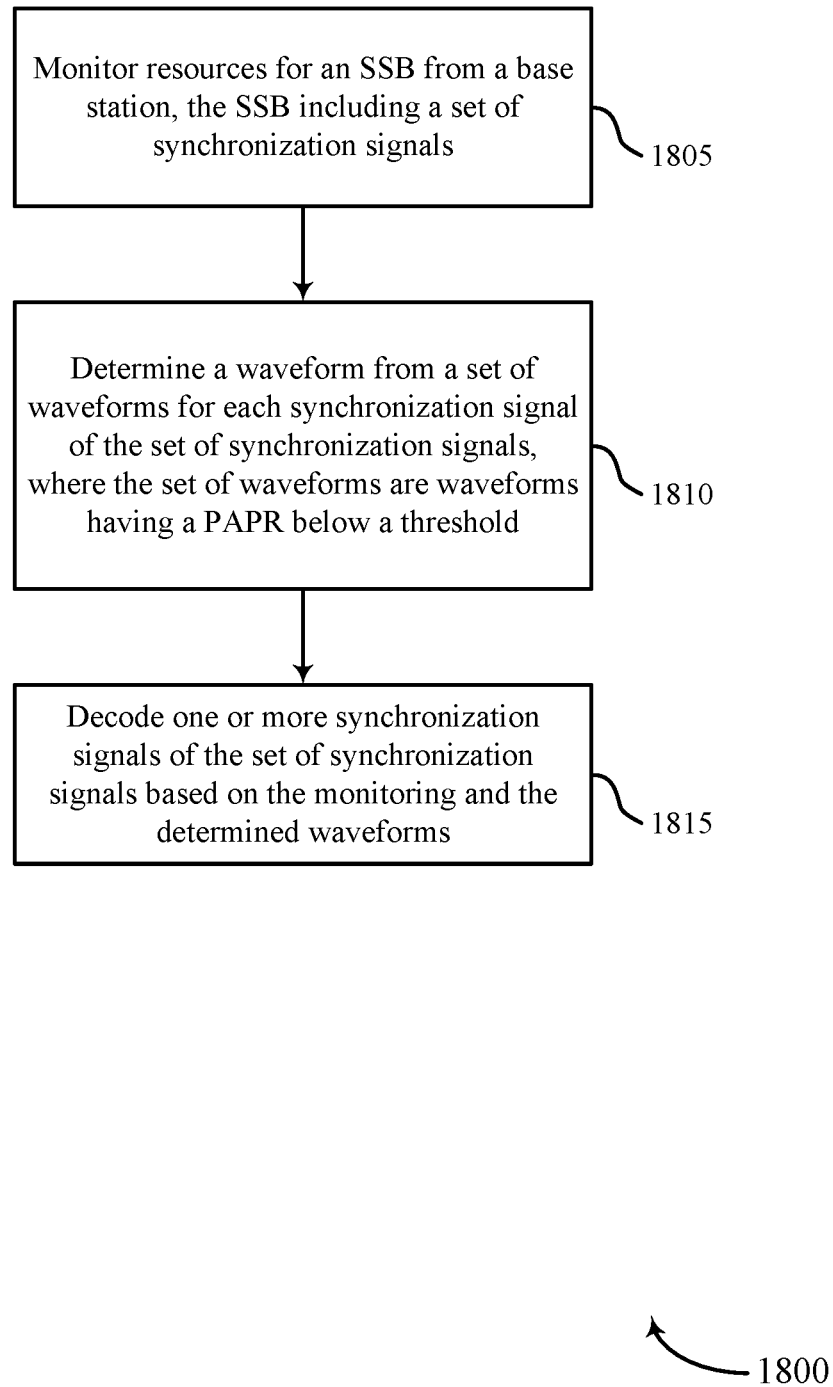

FIG. 18 shows a flowchart illustrating a method 1800 that supports SSB design in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may monitor resources for an SSB from a base station, the SSB including a set of synchronization signals. The operations of 1805 may be performed according to the methods described herein. In some examples, aspects of the operations of 1805 may be performed by an SSB monitoring component as described with reference to FIGS. 6 through 9.

At 1810, the UE may determine a waveform from a set of waveforms for each synchronization signal of the set of synchronization signals, where the set of waveforms are waveforms having a PAPR below a threshold. The operations of 1810 may be performed according to the methods described herein. In some examples, aspects of the operations of 1810 may be performed by a waveform component as described with reference to FIGS. 6 through 9.

At 1815, the UE may decode one or more synchronization signals of the set of synchronization signals based on the monitoring and the determined waveforms. The operations of 1815 may be performed according to the methods described herein. In some examples, aspects of the operations of 1815 may be performed by a synchronization signal decoding component as described with reference to FIGS. 6 through 9.

Figure 19:
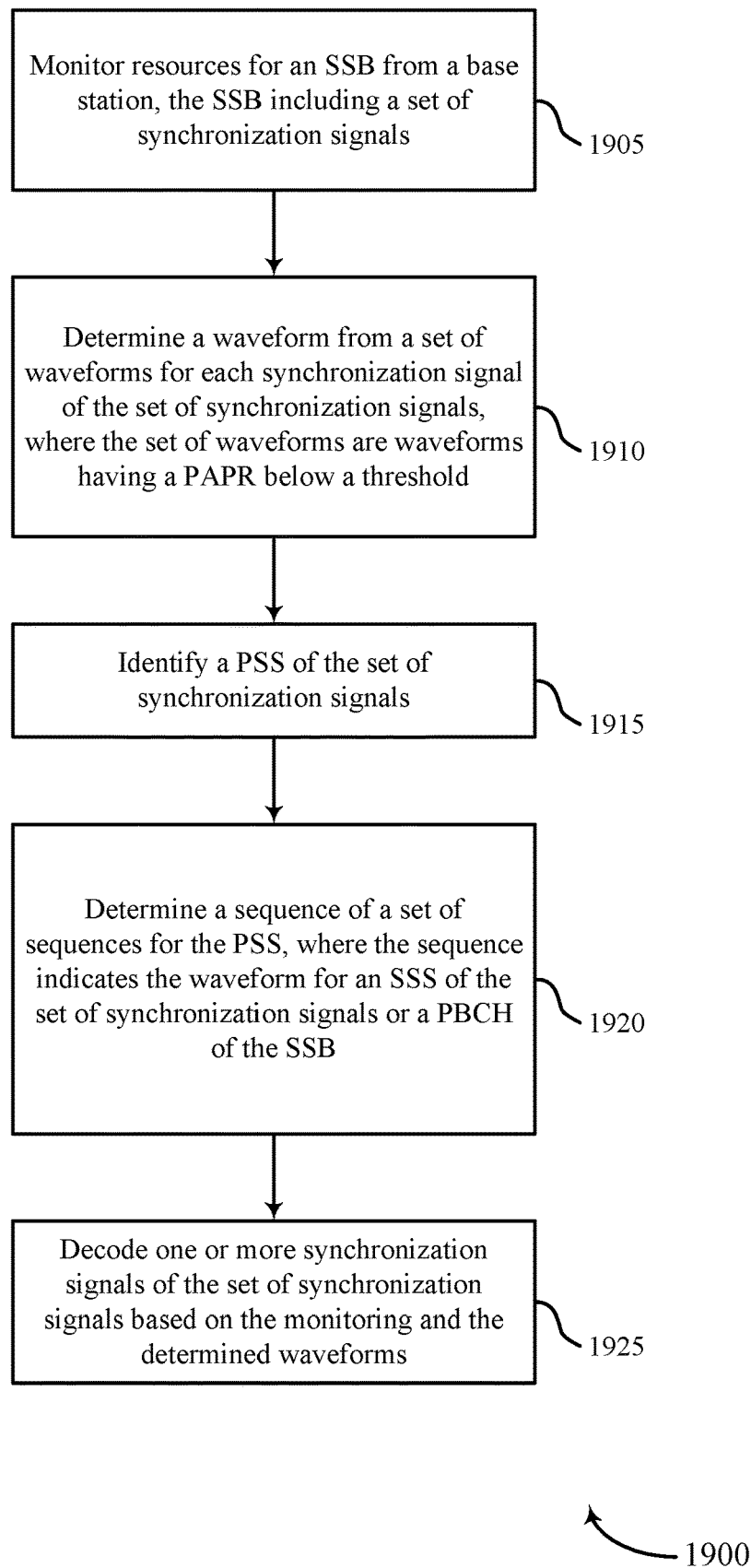

FIG. 19 shows a flowchart illustrating a method 1900 that supports SSB design in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may monitor resources for an SSB from a base station, the SSB including a set of synchronization signals. The operations of 1905 may be performed according to the methods described herein. In some examples, aspects of the operations of 1905 may be performed by an SSB monitoring component as described with reference to FIGS. 6 through 9.

At 1910, the UE may determine a waveform from a set of waveforms for each synchronization signal of the set of synchronization signals, where the set of waveforms are waveforms having a PAPR below a threshold. The operations of 1910 may be performed according to the methods described herein. In some examples, aspects of the operations of 1910 may be performed by a waveform component as described with reference to FIGS. 6 through 9.

At 1915, the UE may identify a PSS of the set of synchronization signals. The operations of 1915 may be performed according to the methods described herein. In some examples, aspects of the operations of 1915 may be performed by a PSS identification component as described with reference to FIGS. 6 through 9.

At 1920, the UE may determine a sequence of a set of sequences for the PSS, where the sequence indicates the waveform for an SSS of the set of synchronization signals or a PBCH of the SSB. The operations of 1920 may be performed according to the methods described herein. In some examples, aspects of the operations of 1920 may be performed by a PSS identification component as described with reference to FIGS. 6 through 9.

At 1925, the UE may decode one or more synchronization signals of the set of synchronization signals based on the monitoring and the determined waveforms. The operations of 1925 may be performed according to the methods described herein. In some examples, aspects of the operations of 1925 may be performed by a synchronization signal decoding component as described with reference to FIGS. 6 through 9.

Figure 20:
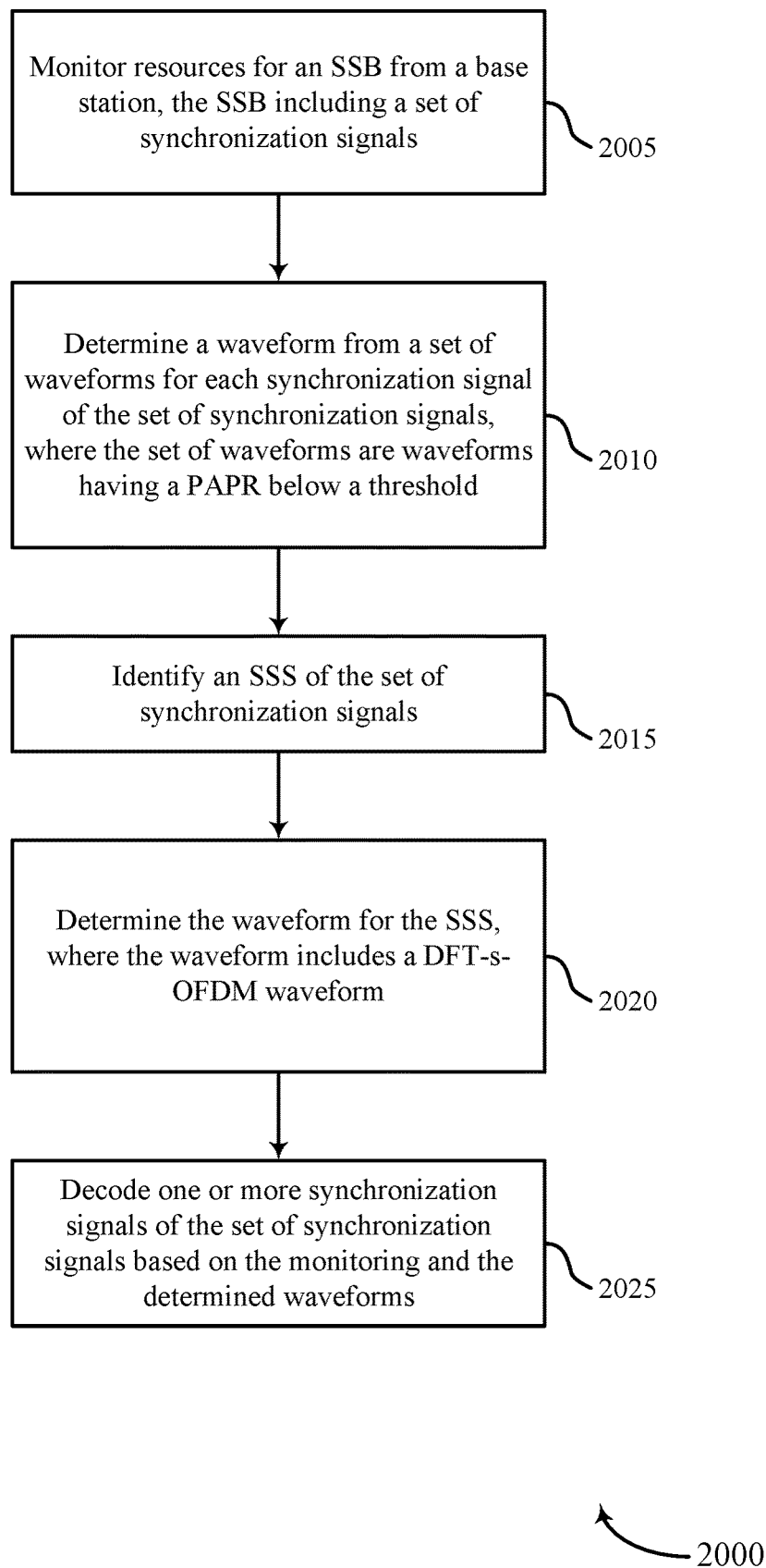

FIG. 20 shows a flowchart illustrating a method 2000 that supports SSB design in accordance with aspects of the present disclosure. The operations of method 2000 may be implemented by a UE 115 or its components as described herein. For example, the operations of method 2000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2005, the UE may monitor resources for an SSB from a base station, the SSB including a set of synchronization signals. The operations of 2005 may be performed according to the methods described herein. In some examples, aspects of the operations of 2005 may be performed by an SSB monitoring component as described with reference to FIGS. 6 through 9.

At 2010, the UE may determine a waveform from a set of waveforms for each synchronization signal of the set of synchronization signals, where the set of waveforms are waveforms having a PAPR below a threshold. The operations of 2010 may be performed according to the methods described herein. In some examples, aspects of the operations of 2010 may be performed by a waveform component as described with reference to FIGS. 6 through 9.

At 2015, the UE may identify an SSS of the set of synchronization signals. The operations of 2015 may be performed according to the methods described herein. In some examples, aspects of the operations of 2015 may be performed by an SSS identification component as described with reference to FIGS. 6 through 9.

At 2020, the UE may determine the waveform for the SSS, where the waveform includes a DFT-s-OFDM waveform. The operations of 2020 may be performed according to the methods described herein. In some examples, aspects of the operations of 2020 may be performed by an SSS identification component as described with reference to FIGS. 6 through 9.

At 2025, the UE may decode one or more synchronization signals of the set of synchronization signals based on the monitoring and the determined waveforms. The operations of 2025 may be performed according to the methods described herein. In some examples, aspects of the operations of 2025 may be performed by a synchronization signal decoding component as described with reference to FIGS. 6 through 9.

Figure 21:
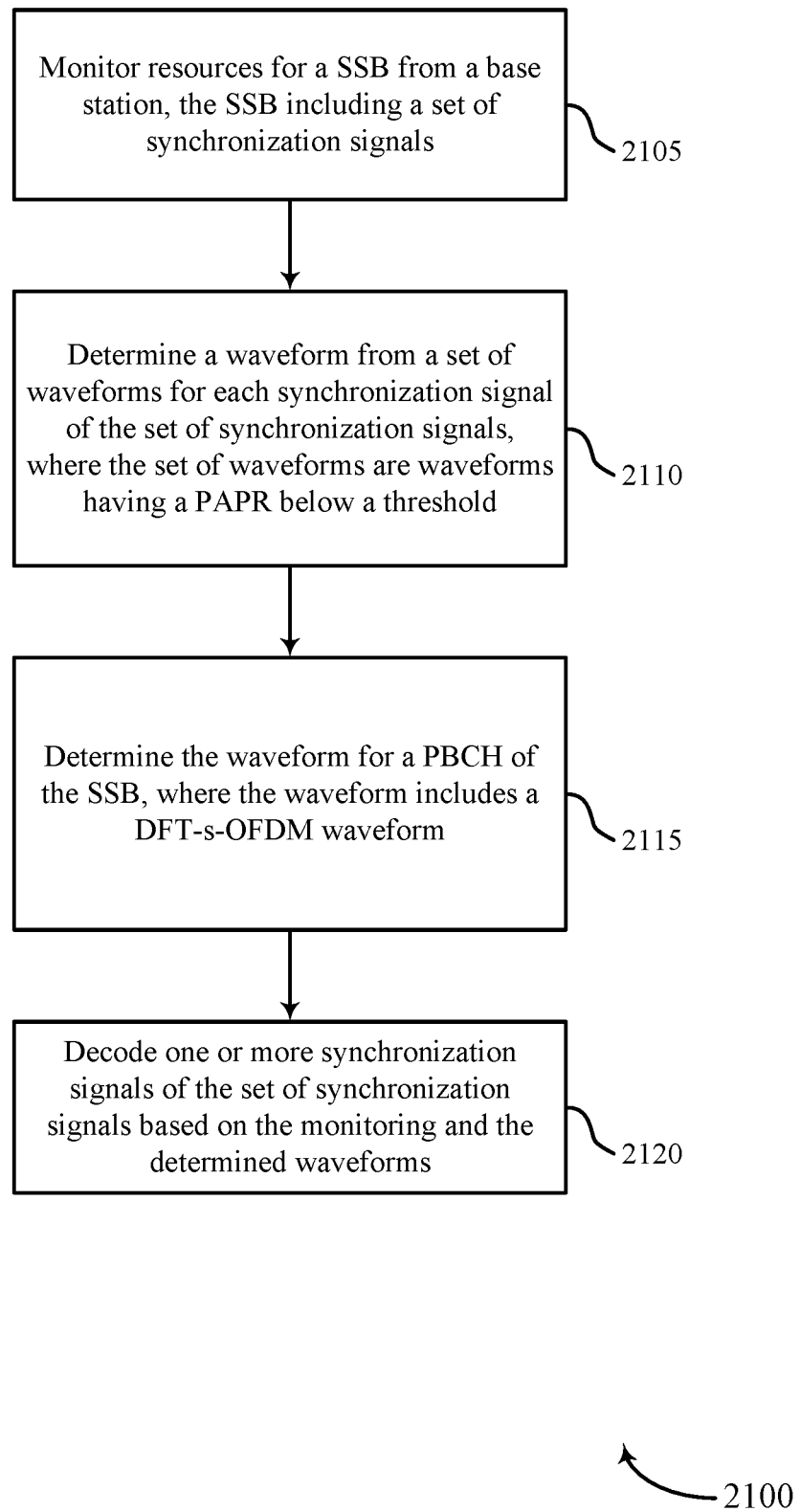

FIG. 21 shows a flowchart illustrating a method 2100 that supports SSB design in accordance with aspects of the present disclosure. The operations of method 2100 may be implemented by a UE 115 or its components as described herein. For example, the operations of method 2100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2105, the UE may monitor resources for an SSB from a base station, the SSB including a set of synchronization signals. The operations of 2105 may be performed according to the methods described herein. In some examples, aspects of the operations of 2105 may be performed by an SSB monitoring component as described with reference to FIGS. 6 through 9.

At 2110, the UE may determine a waveform from a set of waveforms for each synchronization signal of the set of synchronization signals, where the set of waveforms are waveforms having a PAPR below a threshold. The operations of 2110 may be performed according to the methods described herein. In some examples, aspects of the operations of 2110 may be performed by a waveform component as described with reference to FIGS. 6 through 9.

At 2115, the UE may determine the waveform for a PBCH of the SSB, where the waveform includes a DFT-s-OFDM waveform. The operations of 2115 may be performed according to the methods described herein. In some examples, aspects of the operations of 2115 may be performed by a waveform component as described with reference to FIGS. 6 through 9.

At 2120, the UE may decode one or more synchronization signals of the set of synchronization signals based on the monitoring and the determined waveforms. The operations of 2120 may be performed according to the methods described herein. In some examples, aspects of the operations of 2120 may be performed by a synchronization signal decoding component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least A, or B, or C, or a combination thereof means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a base station, comprising:
   identifying a set of synchronization signals for a synchronization signal block;
   selecting a respective waveform for each synchronization signal of the set of synchronization signals, the respective waveform selected from a set of waveforms comprising waveforms configured to have a peak to average power ratio below a threshold;
   selecting a sequence of a set of sequences for a synchronization signal of the set of synchronization signals, the sequence indicating the respective waveform for at least one synchronization signal of the set of synchronization signals; and
   transmitting the synchronization signal block including the set of synchronization signals using the respective waveforms.

2. The method of claim 1, further comprising:
   identifying a primary synchronization signal of the set of synchronization signals, wherein selecting the sequence of the set of sequences for the synchronization signal of the set of synchronization signals comprises selecting a sequence of the set of sequences for the primary synchronization signal, the sequence for the primary synchronization signal indicating the respective waveform for a secondary synchronization signal of the set of synchronization signals or a physical broadcast channel of the synchronization signal block.

3. The method of claim 1, wherein the set of sequences comprises one sequence or more than three sequences.

4. The method of claim 1, further comprising:
   determining a length of a sequence for a primary synchronization signal of the set of synchronization signals, wherein the length is based at least in part on a length of one or more other synchronization signals of the set of synchronization signals, a number of resources allocated for the primary synchronization signal, a number of resources allocated for the one or more other synchronization signals of the set of synchronization signals, or any combination thereof.

5. The method of claim 1, further comprising:
   identifying a secondary synchronization signal of the set of synchronization signals; and
   determining the respective waveform for the secondary synchronization signal, wherein the respective waveform comprises a discrete Fourier transform spread orthogonal frequency division multiplexing (DFT-s-OFDM) waveform.

6. The method of claim 5, further comprising:
   mapping the secondary synchronization signal to an orthogonal frequency division multiplexing (OFDM) symbol of the synchronization signal block independent of other synchronization signals of the set of synchronization signals.

7. The method of claim 6, wherein the OFDM symbol to which the secondary synchronization signal is mapped comprises a same number of resource elements as other OFDM symbols of the synchronization signal block to which one or more other synchronization signals of the set of synchronization signals are mapped.

8. The method of claim 5, further comprising:
   determining a sequence of the set of sequences for the secondary synchronization signal, wherein the sequence for the secondary synchronization signal comprises a n/2 binary phase shift keying (BPSK) sequence, an m-sequence, or a Zadoff-Chu sequence.

9. The method of claim 8, further comprising:
   filtering the sequence for the secondary synchronization signal as a function of a synchronization raster point.

10. The method of claim 5, further comprising:
    including information in resources allocated to the secondary synchronization signal, wherein the information comprises sidelink information, integrated access and backhaul (IAB) information, relay information, vehicle to everything (V2X) information, or any combination thereof.

11. The method of claim 1, further comprising:
multiplexing a demodulation reference signal (DMRS) for a physical broadcast channel with a secondary synchronization signal of the set of synchronization signals according to a DMRS pattern, wherein the DMRS pattern indicates a set of multiple contiguous resource elements for placement of the DMRS.

12. The method of claim 1, further comprising:
determining a waveform for a physical broadcast channel of the synchronization signal block, wherein the waveform comprises a discrete Fourier transform spread orthogonal frequency division multiplexing (DFT-s-OFDM) waveform.

13. The method of claim 1, further comprising:
performing a discrete Fourier transform spreading operation on the synchronization signal block to generate a discrete Fourier transform spread orthogonal frequency division multiplexing (DFT-s-OFDM) waveform of the synchronization signal block.

14. The method of claim 13, wherein a secondary synchronization signal of the set of synchronization signals is multiplexed with a physical broadcast channel of the synchronization signal block.

15. The method of claim 1, further comprising:
identifying a physical broadcast channel of the synchronization signal block;
identifying a demodulation reference signal (DMRS) for the physical broadcast channel; and
mapping the DMRS and the physical broadcast channel to one or more orthogonal frequency division multiplexing (OFDM) symbols of the synchronization signal block based at least in part on a DMRS pattern, wherein the DMRS pattern defines one or more sets of multiple contiguous resource elements for placement of the DMRS.

16. The method of claim 15, wherein the one or more sets of multiple contiguous resource elements and a number of the multiple contiguous resource elements is based at least in part on a number of resource blocks allocated for the physical broadcast channel.

17. The method of claim 15, further comprising:
multiplexing the DMRS according to a time division multiplexing scheme on one or more additional OFDM symbols of the synchronization signal block.

18. The method of claim 15, further comprising:
including a first number of bits in the DMRS, wherein the first number of bits indicates an index of the synchronization signal block; and
including a second number of bits in a payload of the physical broadcast channel, wherein at least one of the first and second numbers of bits are different from 3.

19. The method of claim 1, wherein a demodulation reference signal (DMRS) for a physical broadcast channel of the synchronization signal block, a number of symbols for an independent secondary synchronization signal, a number of synchronization signal blocks of a synchronization signal burst period, or any combination thereof is a function of a synchronization raster point.

20. The method of claim 1, further comprising:
selecting the respective waveform from the set of waveforms for each synchronization signal of the set of synchronization signals based at least in part on a synchronization raster point.

21. The method of claim 1, further comprising:
indicating information corresponding to the synchronization signal block in a system information block (SIB), wherein the information comprises an indication of one or more groups of synchronization signal blocks and one or more sets of synchronization signal blocks of the one or more groups of synchronization signal blocks for transmission by the base station.

22. A method for wireless communications at a user equipment (UE), comprising:
monitoring resources for a synchronization signal block from a base station, the synchronization signal block comprising a set of synchronization signals;
determining a waveform for a synchronization signal of the set of synchronization signals, the waveform determined from a set of waveforms comprising waveforms configured to have a peak to average power ratio below a threshold;
determining a sequence of a set of sequences for the synchronization signal of the set of synchronization signals, the sequence indicating a respective waveform from the set of waveforms for at least one synchronization signal of the set of synchronization signals; and
decoding one or more synchronization signals of the set of synchronization signals based at least in part on the monitoring and the respective waveforms.

23. The method of claim 22, further comprising:
identifying a primary synchronization signal of the set of synchronization signals, wherein determining the sequence of the set of sequences for the synchronization signal of the set of synchronization signals comprises determining a sequence of the set of sequences for the primary synchronization signal, the sequence for the primary synchronization signal indicating the respective waveform for a secondary synchronization signal of the set of synchronization signals or a physical broadcast channel of the synchronization signal block.

24. The method of claim 22, further comprising:
determining a length of a sequence for a primary synchronization signal of the set of synchronization signals, wherein the length is based at least in part on a length of one or more other synchronization signals of the set of synchronization signals, a number of resources allocated for the primary synchronization signal, a number of resources allocated for the one or more other synchronization signals of the set of synchronization signals, or any combination thereof.

25. The method of claim 22, further comprising:
identifying a demodulation reference signal (DMRS) for a physical broadcast channel multiplexed with a secondary synchronization signal of the set of synchronization signals based at least in part on a DMRS pattern, wherein the DMRS pattern indicates a set of multiple contiguous resource elements for placement of the DMRS.

26. The method of claim 22, further comprising:
identifying a secondary synchronization signal of the set of synchronization signals; and
determining the respective waveform for the secondary synchronization signal, wherein the respective waveform comprises a discrete Fourier transform spread orthogonal frequency division multiplexing (DFT-s-OFDM) waveform.

27. The method of claim 22, further comprising:
determining a waveform for a physical broadcast channel of the synchronization signal block, wherein the waveform comprises a discrete Fourier transform spread orthogonal frequency division multiplexing (DFT-s-OFDM) waveform.

28. The method of claim 22, further comprising:

identifying a demodulation reference signal (DMRS) for a physical broadcast channel of the synchronization signal block based at least in part on a DMRS pattern, wherein the DMRS pattern defines one or more sets of multiple contiguous resource elements for the DMRS.

29. An apparatus for wireless communications at a base station, comprising: a processor, memory coupled with the processor; and instructions stored in the memory and executable by the processor to cause the apparatus to:

identify a set of synchronization signals for a synchronization signal block;

select a respective waveform for each synchronization signal of the set of synchronization signals, the respective waveform selected from a set of waveforms comprising waveforms configured to have a peak to average power ratio below a threshold;

select a sequence of a set of sequences for a synchronization signal of the set of synchronization signals, the sequence indicating the respective waveform for at least one synchronization signal of the set of synchronization signals; and transmit the synchronization signal block including the set of synchronization signals using the respective waveforms.

30. An apparatus for wireless communications at a user equipment (UE), comprising: a processor, memory coupled with the processor; and instructions stored in the memory and executable by the processor to cause the apparatus to:

monitor resources for a synchronization signal block from a base station, the synchronization signal block comprising a set of synchronization signals;

determine a waveform for a synchronization signal of the set of synchronization signals, the waveform determined from a set of waveforms comprising waveforms configured to have a peak to average power ratio below a threshold;

determine a sequence of a set of sequences for the synchronization signal of the set of synchronization signals, the sequence indicating a respective waveform from the set of waveforms for at least one synchronization signal of the set of synchronization signals; and decode one or more synchronization signals of the set of synchronization signals based at least in part on the monitoring and the respective waveforms.

* * * * *